United States Patent
Peterson et al.

(10) Patent No.: US 10,783,173 B2
(45) Date of Patent: Sep. 22, 2020

(54) METHODS AND SYSTEMS FOR SELECTING AND ANALYZING GEOSPATIAL DATA ON A DISCRETE GLOBAL GRID SYSTEM

(71) Applicant: Global Grid Systems Inc., Calgary (CA)

(72) Inventors: Perry R. Peterson, Kingston (CA); Idan Shatz, Calgary (CA); Wade Hardman, Paris (CA); Logan M. Rakai, Calgary (CA); Nader Hamekasi, Calgary (CA); Ryan A. Taylor, Kelowna (CA)

(73) Assignee: Global Grid Systems Inc., Calgary, Alberta (CA)

( * ) Notice: Subject to any disclaimer, the term of this patent is extended or adjusted under 35 U.S.C. 154(b) by 123 days.

(21) Appl. No.: 15/484,093

(22) Filed: Apr. 10, 2017

(65) Prior Publication Data
US 2017/0293635 A1    Oct. 12, 2017

Related U.S. Application Data

(60) Provisional application No. 62/320,099, filed on Apr. 8, 2016.

(51) Int. Cl.
*G06F 7/02*   (2006.01)
*G06F 16/00*  (2019.01)
(Continued)

(52) U.S. Cl.
CPC .......... *G06F 16/29* (2019.01); *G06F 16/2477* (2019.01); *G06F 16/24568* (2019.01); *G06F 16/9537* (2019.01)

(58) Field of Classification Search
CPC .......... G06F 17/30241; G06F 17/3087; G06F 17/30554; G06F 17/30516; G06F 17/3051;
(Continued)

(56) References Cited

U.S. PATENT DOCUMENTS 3,696,566 A   10/1972  Langner
3,953,948 A    5/1976  Hogan
(Continued)

FOREIGN PATENT DOCUMENTS

CA   2436312 C    4/2011
CA   3000700 A1   10/2018
(Continued)

OTHER PUBLICATIONS

Garofalakis, et al., "Approximate query processing: Taming the terabytes", In Proceedings of the 27th International Conference on Very Large Data Bases (VLDB), Sep. 11-14, 2001, pp. 169-212.
(Continued)

*Primary Examiner* — Bruce M Moser
(74) *Attorney, Agent, or Firm* — Bereskin & Parr LLP/S.E.N.C.R.L., s.r.l.; Timothy Sinnott; Tony Orsi

(57) ABSTRACT

Various embodiments are described herein for systems and methods for allowing user at a client terminal to interacts with a graphical user interface having a DGGS globe to perform spatial analysis on DGGS spatial data based on a spatial query on unified spatial data that may be obtained from distributed geospatial data sources having different data formats. The spatial analysis results can include a resulting collection of cells that can be displayed on the DGGS globe and/or aggregated spatial statistics that can be displayed in a DGGS legend at the graphical user interface. In one aspect, the spatial analysis can be iteratively performed to obtain a refined resulting collection of cells and aggregated spatial statistics. In another aspect, the resulting cells and/or aggregated spatial statistics can be added to a geospatial data source that can be accessed by another client terminal that is performing other geospatial analysis.

28 Claims, 8 Drawing Sheets

(51) Int. Cl.
  *G06F 16/29*    (2019.01)
  *G06F 16/9537*  (2019.01)
  *G06F 16/2458*  (2019.01)
  *G06F 16/2455*  (2019.01)

(58) Field of Classification Search
  CPC .... G06F 3/0481; G06F 16/29; G06F 16/9537; G06F 16/9538; G06F 16/2477; G06F 16/248; G06F 16/24568
  See application file for complete search history.

(56) References Cited

U.S. PATENT DOCUMENTS

| | | |
|---|---|---|
| 4,691,291 A | 9/1987 | Wolfram |
| 4,809,202 A | 2/1989 | Wolfram |
| 5,631,970 A | 5/1997 | Hsu |
| 5,675,720 A | 10/1997 | Sato et al. |
| 5,781,195 A | 7/1998 | Marvin |
| 5,848,404 A | 12/1998 | Hafner et al. |
| 5,999,187 A | 12/1999 | Dehmlow et al. |
| 6,308,177 B1 | 10/2001 | Israni et al. |
| 6,313,837 B1 | 11/2001 | Assa et al. |
| 6,359,629 B1 | 3/2002 | Hoperoft et al. |
| 6,384,826 B1 | 5/2002 | Bern et al. |
| 6,414,683 B1 | 7/2002 | Gueziec |
| 6,828,966 B1 | 12/2004 | Gavriliu et al. |
| 7,225,207 B1 | 5/2007 | Ohazama et al. |
| 7,340,001 B2 | 3/2008 | Smith et al. |
| 7,876,967 B2 | 1/2011 | Sahr |
| 8,018,458 B2 | 9/2011 | Peterson |
| 3,400,451 A1 | 3/2013 | Peterson |
| 8,972,405 B1 | 3/2015 | Chaulk et al. |
| 9,311,350 B2 | 4/2016 | Sahr |
| 9,600,538 B2 | 3/2017 | Shatz |
| 10,176,629 B2 | 1/2019 | Samavati et al. |
| 2001/0012780 A1 | 8/2001 | Edwards |
| 2002/0069018 A1 | 6/2002 | Brueckner et al. |
| 2003/0112281 A1 | 6/2003 | Sriram et al. |
| 2003/0227455 A1 | 12/2003 | Lake |
| 2004/0201585 A1 | 10/2004 | Srivastava et al. |
| 2004/0225665 A1 | 11/2004 | Toyama et al. |
| 2005/0143919 A1 | 6/2005 | Williams |
| 2005/0193365 A1 | 9/2005 | Sahr |
| 2005/0223337 A1 | 10/2005 | Wheeler et al. |
| 2006/0224356 A1 | 10/2006 | Castelli et al. |
| 2006/0238379 A1* | 10/2006 | Kimchi ............... G01C 21/26 340/995.1 |
| 2006/0265197 A1* | 11/2006 | Peterson ............... G06T 9/40 703/2 |
| 2008/0055310 A1 | 3/2008 | Mitchell et al. |
| 2008/0258915 A1 | 10/2008 | Vennelakanti et al. |
| 2009/0195358 A1 | 8/2009 | Vennelakanti et al. |
| 2009/0198736 A1 | 8/2009 | Shen et al. |
| 2011/0057931 A1* | 3/2011 | Goel ............... G06T 17/20 345/423 |
| 2011/0302164 A1 | 12/2011 | Krishnamurthy et al. |
| 2012/0036662 A1 | 2/2012 | Dicklin |
| 2012/0206494 A1 | 8/2012 | Sahr |
| 2015/0058390 A1 | 2/2015 | Bogosian |
| 2016/0203211 A1* | 7/2016 | Milton ............... H04L 51/20 705/14.58 |
| 2017/0178376 A1* | 6/2017 | Hong ............... G06T 11/206 |
| 2017/0242873 A1* | 8/2017 | Barrow ............... G06F 16/29 |

FOREIGN PATENT DOCUMENTS

| | | |
|---|---|---|
| WO | 2005013200 A1 | 2/2005 |
| WO | 2011053728 A1 | 5/2011 |

OTHER PUBLICATIONS

Lazardis, et al., "Progressive Approximate Aggregate Queries with a Multi-Resolution Tree Structure", In Proceedings of the 2001 ACM SIGMOD International Conference on Management of Data, May 21-24 2001, ACM, New York, NY, pp. 401-412.

Vince, "Indexing the Aperture 3 Hexagonal Discrete Global Grid", J. Vis. Commun. Image R., 2006, 17(6): 1227-1236.

"The Evolving Mission of NGA", Chapter 2 (pp. 9-22), in The National Academies, "Priorities for GEOINT Research at the National Geospatial Intellgence Agency", Washington, DC: The National Academies Press, 2006 <https://www.nap.edu/read/11601/chapter/2#2>.

Purss, ed., "OGC Discrete Global Grid System (DGGS) Core Standard", Open Geospatial Consortium, 15-104r3, posted online Jan. 5, 2016 (submitted Sep. 30, 2015), pp. 1-41 <https://portal.opengeospatial.org/files/66643>.

Purss, ed., "Topic 21: Discrete Global Grid System Abstract Specification", Open Geospatial Consortium, 15-104r5, Aug. 1, 2017 (earlier version posted online Jan. 5, 2016), pp. 1-57 <http://docs.opengeospatial.org/as/15-104r5/15-104r5.html>.

Sahr et al., "Discrete Global Grid Systems", Computing Science and Statistics, 1998, 30 ed. S. Weisberg, Interface Foundation of North America, Inc., Fairfax Station, VA (10 pages) <http://bufo.geo.orst.edu/tc/firma/gg/pubs/gdggs98.pdf>.

Carr et al., "Topics in Information Visualization: ISEA Discrete Global Grids", Statistical Computing & Statistical Graphics Newsletter, vol. 8, Nos. 2-3, Winter 1997, pp. 31-39 <http://stat-computing.org/newsletter/issues/scgn-08-2.pdf> or <http://www.galaxy.gmu.edu/-dcarr/lib/v8n2.pdf>.

Panu et al., "Runoff Hydrographs by the Hexagon Grid Method", Proceedings of the CSCE Annual Conference, 1990, vol. 5, pp. 341-358.

Russell, "Spatial Data and the Voronoi Tessellation", Dr. Dobb's Journal, Dec. 1, 1992, online pub Jul. 22, 2001 <http://www.ddj.com/184408891>.

Goil et al., "A Parallel Scalable Infracture for OLAP and Data Mining", In Proceedings of the International Database Engineering and Applications Symposium, 1999, IEEE, pp. 178-186.

Middleton et al., 2005. "Hexagonal Image Processing: A Practical Approach" (Advances in Pattern Recognition). Cover page and Chapter 3, The Proposed HIP Framework, pp. 27-69, Seacaucus, NJ, USA: Springer-Verlag New York, Inc.

Qi et al., "Near-Uniform Range Parition Approach for Increased Partitioning in Large Database", In 2010 2nd IEEE International Conference on Information Management and Engineering (ICIME), Apr. 16-18, 2010, Chengdu, CN, pp. 101-106.

Ramsak et al., "Interactive ROLAP on large datasets: A case study with UB-Trees", In Proceedings of the International Database Engineering & Applications Symposium (IDEAS '01), Jul. 16-18, 2001, Grenoble, FR, IEEE, pp. 167-176.

Gaede et al., "Multidimensional Access Methods", ACM Computing Surveys (CSUR), New York, Jun. 1, 1998, NY, 30 (2): 170-231.

Gibson et al., "Spatial Data Processing Using Generalized Balanced Ternary", Proceedings of the IEEE Computer Society Conference on Pattern Recognition and Image Processing, Interactive Systems Corporation, Littleton, Colorado, Jun. 1982, pp. 566-571.

Kobbelt, "√3-Subdivision", published by Max-Planck Institute for Computer Sciences, Germany, 2001, SIGGRAPH 2000: 103-112 <http://www-i8.infomatik.rwth-aachen.de/publications.downloads/sqrt.3.pdf>.

Snyder, "An Equal-Area Map Projection for Polyhedral Globes", United States Geological Survey, Reston, VA, Cartographica, 1992, 29(1): 10-21.

Dutton, "Encoding and Handling Geospatial Data with Hierarchical Triangular Meshes", In Kraak, M.J. and Molenarr, M. (eds), Advances in GIs Researh II, London: Taylor & Francis, pp. 505-518, 1996, Dept. of Geography, Univ. of Zurich, Switzerland <http://www.spatial-effects.com/SE-papers1.html#SDH96>.

Kimerling, "Discrete Global Grids", May 8, 2002 <www.ncgia:ucsb.edu/globalgrids-book> or <http://dusk2.geo.orst.edu/buffgis/dr_k.html> and projects by colleague Denis White at the EPA (3 pages).

Non-final Office Action and Notice of References Cited dated Feb. 3, 2016 in related U.S. Appl. No. 14/207,843 (14 pages).

Sahr et al., "Geodesic Discrete Global Grid Systems", Cartography and Geographic Information Science, Apr. 2, 2003, 30(2): 121-134.

(56) References Cited

OTHER PUBLICATIONS

Gilmore, et al., "Hipparchus Tutorial and Programmer's Guide", Feb. 27, 2004 <http://www.geodyssey.com/tutorial/tc00.html>; Chapter 6: Working with Voronoi Cells <http://www.geodyssey.com/tutorial/tc06.html> (18 pages).

Frisch et al., "Lattice-Gas Automata for the Navier-Stokes Equation", Physical Review Letters, Apr. 8, 1986, 56(14): 1505-1508.

Thomson et al., "On the Division of Space with Minimum Partitional Area", The London, Edinburgh, and Dublin Philosophical Magazine and Journal of Science, Jul.-Dec. 1887, vol. XXIV-Fifth Series, pp. 503-514.

Gore, "The Digital Earth: Understanding our planet in the 21st Century", speech, California Science Center, Los Angeles, California, Jan. 31, 1998. (4 pages).

Gibb et al., "Discrete Global Grid Systems", position, Dec.-Jan. 2017, pp. 26-28.

Non-final Office Action and Notice of References Cited dated Oct. 30, 2008 in related U.S. Appl. No. 10/552,901 (13 pages).

Final Office Action and Notice of References Cited dated Nov. 25, 2009 in related U.S. Appl. No. 10/552,901 (17 pages).

Non-final Office Action and Notice of References Cited dated Nov. 10, 2010 in related U.S. Appl. No. 10/552,901 (17 pages).

Non-final Office Action and Notice of References Cited dated Dec. 13, 2011 in related U.S. Appl. No. 13/230,338 (12 pages).

Examiner's Report dated Dec. 10, 2007 in related CA Patent Application No. 2,436,312 (4 pages).

International Search Report and Written Opinion dated Dec. 17, 2004 in related International Patent Application No. PCT/CA2004/001507 (9 pages).

Supplementary European Search Report dated Jun. 19, 2009 in related EP Patent Application No. 04761671.9 (2 pages).

Peterson, "Earth Observation Analysis with Multi-Source Data Streams", Global Earth Observation System of Systems Architecture Implementation Pilot 4, Interoperable EO Client Application and Multi Source Analysis, Dec. 2011 <https://vimeo.com/32222685> (1 page).

Peterson et al., "Land and Poverty Demo", video of conference presentation, Discrete Global Grid Systems: A Standard for Sharing Multi-source Analysis and Modeling. Annual world bank conference on land and poverty 2015: Linking Land Tenure and Use for Shared Prosperity <https://vimeo.com/122591267> (1 page).

Peterson, "OGC TC Sydney 2015", video of presentation, Dec. 3, 2015, Sydney, AU <https://vimeo.com/148433090> (1 page).

Vince, et al., "Arithmetic and Fourier transform for the PYXIS multi-resolution digital Earth model", Int. J. Digital Earth, 2009, 2(1): 59-79.

Van Der Lans, "Clearly Defining Data Virtualization, Data Federation, and Data Integration", BeyeNETWORK, online article, Dec. 16, 2010 <http://www.b-eye-network.com/view/14815> (7 pages).

Burt, "Tree and Pyramid Structures for Coding Hexagonally Sampled Binary Images", Computer Graphics and Image Processing, 1980, 14: 271-280.

Sahr, "Location coding on icosahedral aperture 3 hexagon discrete global grids", Computers Environment and Urban Systems, 2008, 32(3): 174-187.

Middleton et al., "Framework for practical hexagonal-image processing", Journal of Electric Imaging, 2002, 11(1): 104-114.

Ben et al., "A Spatial Indexing Method for the Hexagon Discrete Global Grid System", 2010 18th International Conference on Geoinformatics, Jun. 18-20, 2010, Beijing, CN (5 pages).

Notices of Allowance and References Cited dated May 8, 2019 in related U.S. Appl. No. 16/210,511 (8 pages).

Dutton, "The making of a Global Grid—Remembering my escape from flatland", 9th Symposium of the International Society for Digital Earth (ISDE), IPO Conf. Series: Earth and Environmental Science, Apr. 1, 2016, 34(1): 012007 (pp. 1-10).

Craglia et al., "Digital Earth 2020: towards the vision for the next decade", International Journal of Digital Earth, 2012, 5(1): 4-21.

Goodchild et al., "Next-generation Digital Earth", PNAS, 2012, 109(28): 11088-11094.

Wang, "Digital Earth", Institute of Remote Sensing and Digital Earth, Chinese Academy of Sciences, Richardson et al., eds., The International Encyclopedia of Geography, John Wiley & Sons, Ltd., 2017, pp. 1-9.

Dutton, "A Hierarchical Coordinate System for Geoprocessing and Cartography", Bhattacharji et al., eds., Lecture Notes in Earth Sciences, Springer-Verlag, Berlin, Germany, 1999, pp. 1-130.

* cited by examiner

METHODS AND SYSTEMS FOR SELECTING AND ANALYZING GEOSPATIAL DATA ON A DISCRETE GLOBAL GRID SYSTEM

CROSS-REFERENCE TO RELATED APPLICATION

This application claims the benefit of United States Provisional Patent Application No. 62/320,099 filed Apr. 8, 2016; the entire contents of Patent Application No. 62/320,099 are hereby incorporated by reference.

TECHNICAL FIELD

The disclosure herein relates to systems and methods for providing distributed geospatial data and analysis, and display of the geospatial analysis including associated values and statistics on a graphical user interface based on a discrete global grid system (DGGS).

BACKGROUND

The process of inquiry that leads to improved understanding of real-world phenomena is known generally as spatial analysis. The US National Geospatial Intelligence Agency describes that "the key stages in geospatial information handling are to acquire, identify, integrate, analyze, disseminate, and preserve."[1] The main goal of acquiring and identifying geospatially referenced information is the creation of data values that measure and describe aspects of these phenomena. Spatial analysis requires fusing or integrating multiple sources of data so the resulting product is contextually meaningful enough to result in new knowledge worth sharing, preserving and acting upon.

[1] The US National Geospatial Intelligence Agency Priorities for GEOINT Research.pdf The fulfilled value of the spatial analysis workflow could be determined by examining its adequacy to answer either of the two fundamental spatial questions: "Where is it?" and "What is here?". Maps have traditionally been used to convey answers to these fundamental spatial questions. Digital maps essentially emulate these traditional products by encoding the colours of a map feature into RGB images. These are typically organized into a hierarchy of image tiles to permit efficient zoom in/zoom out navigation. However, the use of maps to convey the results of the workflow and operations for further spatial analysis is generally limited to visual reference on the maps.

Products that allow access to the underlying attribution (e.g. attribute data) that describe the state and behaviour of phenomena for a particular spatial location—the subject and object of these fundamental spatial questions—can provide input to numerical methods of analysis and modelling common in geographic information systems and remote sensing (GIS). At present however, the spatial analysis process— from data acquisition to knowledge creation—is complex. It currently requires an expert in the practice GIS to handle the data through the spatial analysis workflow.

In this workflow, the phenomena or object of the inquiry is represented by geographic location (i.e. place), time, and data values that describe certain attributes of the object (which may be a particular area or collection of areas somewhere in the world). These attributes are formally organized using either vector geometries or raster imagery and recorded in complex, large and dynamic information formats with various methods of spatial reference, spatial scales, and semantic models. In one method of organization, vectors describe precise shapes of features and boundaries— as an example polygons outlining protected parkland—with attribution linked to the feature. In another method of organization, images cover a generalized area of the ground with specific attributes encoded as discrete values—as an example type of land cover—in each pixel. Spatial reference can also be attributed to objects described in a database table wherein some field(s) of a table describe the location of the object—as an example a tabular list of caribou with a reference to their location at a specified time.

It is presently a non-trivial operation to integrate these sources of data sufficient for spatial analysis operations. The present data integration process requires co-registration of data to a common geometry and schema. In particular, the current practice for combining the spatial data is accomplished by tabular, spatial joining and/or gridding and resampling of the data. There are various technical challenges that must be overcome which include, but are not limited to, spatial and temporal conflation between variable geometries, attribute ontologies, accuracies, and resolutions.

It is particularly challenging that points on a lattice of geographic coordinate systems created primarily for navigation do not have an implied area to represent information about a phenomenon; points essentially have no dimension and so when comparing data of two points additional data or interpretation is required and using coordinate pairs to relate and join database tables, for example, is problematic.

The "Digital Earth" is a conceptual idea for a distributed, participatory, on-demand spatial analysis system. There is acknowledgement that present methods of integrating disparate geospatial data sources will not serve to meet the on-demand spatial analysis requirements of a Digital Earth system where data sources are widely distributed and have various formats, sizes, scales, and ontologies:

"It is tempting to compare the necessary source integration to the multiple map-layer data model commonly encountered in NGA's existing geographic information system (GIS) technology . . . . A layered model, however, is inadequate. Multisource information does not easily resolve into layers; consequently, this information fits poorly with the existing GIS approach . . . . The simple "data integration by spatial coregistration" standard that is the foundation GIS needs to be superseded."[2]

[2] Id. NGA

Discrete global grid systems (DGGS) are formally defined as "a spatial reference system that uses a hierarchical tessellation of cells to partition and address the globe. DGGS are characterized by the properties of their cell structure, geo-encoding, quantization strategy and associated mathematical functions."[3] The atom of a DGGS is a cell and cells of the same shape, area, and resolution are given a fixed location and organized to cover the entire globe. Each tessellation of cells can refine into smaller child cells. Data values from traditional GIS data sources can be associated with the individual cells and thus portray real-world phenomena. However, a distributed, participatory, on-demand spatial analysis system like Digital Earth, and in particular one based on DGGS, has not been developed that is simple, easy and intuitive to use so that even school children may use it.

[3] Open Geospatial Consortium Discrete Global Grid System Abstract Standard ref 15-104r4

SUMMARY OF VARIOUS EMBODIMENTS

Various embodiments of methods and systems are provided according to the teachings herein for allowing user at a client terminal to interacts with a graphical user interface having a DGGS globe to perform spatial analysis on DGGS spatial data based on a spatial query on unified spatial data that may be obtained from distributed geospatial data sources having different data formats.

In a broad aspect, at least one embodiment described herein provides a computer-implemented method for performing spatial analysis on a Discrete Global Grid System (DGGS) globe of a graphical user interface on a client terminal, the DGGS globe comprising a hierarchical tessellation of cells, wherein the method comprises: sending a spatial query from the client terminal to at least one controller with at least one encoder, the spatial query comprising an initial cell collection and search constraints based on one or more of at least one value, at least one metadata, at least one attribute name and at least one time value; identifying at least one encoder data stream having DGGS values for geospatial data that was obtained from two or more distributed geospatial data sources, where the at least one encoder data stream corresponds with the initial cell collection and the at least one search constraint; fetching the identified DGGS values; performing DGGS operations on the DGGS values to generate aggregated spatial statistics; and displaying, at the client terminal, the resulting collection of cell values and resulting aggregated spatial statistics in at least one of a DGGS legend and at least a portion of the DGGS globe.

In at least one embodiment, the method further comprises: generating a refined cell collection by sub-selecting cells using DGGS operations on data values associated with the cell collection and/or the aggregated spatial statistics; sending an updated spatial query including the refined cell collection and updated search constraints from the client terminal to the at least one controller and the at least one encoder; identifying at least one encoder data stream having DGGS values for geospatial data that was obtained from two or more distributed geospatial data sources, where the at least one encoder data stream corresponds with the refined cell collection and the updated search constraints; fetching the identified DGGS values; performing DGGS operations on the DGGS values to generate refined aggregated spatial statistics; and displaying, at the client terminal, the resulting collection of cell values and resulting aggregated spatial statistics in at least one of the DGGS legend and at least a portion of the DGGS globe.

In at least one embodiment, the updated search constraints comprise at least one of an updated cell collection, at least one updated value, at least one updated metadata, at least one updated attribute name and at least one updated time value.

In at least one embodiment, the updated search constraints further comprise specifying at least one additional distributed geospatial data source.

In at least one embodiment, the method comprises: generating a refined cell collection by sub-selecting cells using DGGS operations on data values associated with the cell collection and/or the aggregated spatial statistics; performing DGGS operations on the DGGS values to generate refined aggregated spatial statistics; and displaying, at the client terminal, the resulting collection of cell values and resulting aggregated spatial statistics in at least one of the DGGS legend and at least a portion of the DGGS globe.

In at least one embodiment, the method further comprises applying a data stream decoder to transform data streams to formats that can be read and displayed at the client terminal.

In at least one embodiment, the acts of identifying the at least one encoder data stream, fetching the identified DGGS values; and performing the DGGS operations to generate the aggregated spatial statistics occur at the at least one controller and the method further comprises, at the at least one controller: sending a data stream comprising indices of the resulting collection of cells and the aggregated spatial statistics to the client terminal.

In at least one embodiment, the method further comprises: sending cell indices for the resulting collection of cells to an encoder associated with the identified at least one encoder data stream; fetching the identified DGGS values; calculating, at the encoder, the aggregated spatial statistics on the DGGS values in the identified at least one encoder data stream; and sending a data stream comprising indices for the resulting collection of cells and the aggregated spatial statistics from the encoder to the client terminal.

In at least one embodiment, the method further comprises: sending cell indices for the resulting collection of cells to an encoder associated with the identified at least one encoder data stream; fetching the identified DGGS values; sending a data stream comprising indices for the resulting collection of cells and the identified DGGS values from the encoder to the client terminal; and calculating, at the client terminal, the aggregated spatial statistics on the DGGS values in the identified at least one encoder data stream and displaying the resulting collection of cell values and resulting aggregated spatial statistics in at least one of a DGGS legend and at least a portion of the DGGS globe.

In at least one embodiment, the method further comprises: locating an additional geospatial data source; extracting, recording, and encoding geospatial data from the additional geospatial data source; and registering the encoded geospatial data at the at least one controller.

In at least one embodiment, the acts of locating and extracting, recording and encoding occur at the client terminal, at the at least one controller or at an encoder associated with the additional geospatial data source.

In at least one embodiment, the method further comprises registering the resulting collection of cells and the resulting aggregated spatial statistics with the at least one controller.

In another broad aspect, at least one embodiment described herein provides a system for a system for performing spatial analysis on a Discrete Global Grid System (DGGS) globe comprising a hierarchical tessellation of cells wherein the system comprises: at least one controller with at least one encoder for controlling the operation of the system; and a client terminal, operatively coupled to the controller, the client terminal comprising a graphical user interface for displaying the DGGS globe, the client terminal being configured to send a spatial query to the at least one controller, the spatial query comprising an initial cell collection and search constraints based on one or more of at least one value, at least one metadata, at least one attribute name and at least one time value; wherein, at least one encoder data stream having DGGS values is identified for geospatial data that was obtained from two or more distributed geospatial data sources, where the at least one encoder data stream corresponds with the initial cell collection and the at least one search constraint; identified DGGS values are fetched; DGGS operations are performed on the DGGS values to generate aggregated spatial statistics; and the client terminal is configured to display the resulting collection of cells values and resulting aggregated spatial statistics in at least one of a DGGS legend and at least a portion of the DGGS globe.

In at least one embodiment, the client terminal is configured to generate a refined cell collection by sub-selecting cells using DGGS operations on data values associated with the cell collection and/or the aggregated spatial statistics; send an updated spatial query including the refined cell collection and updated search constraints from the client terminal to the at least one controller and the at least one encoder; identify at least one encoder data stream having DGGS values for geospatial data that was obtained from two or more distributed geospatial data sources, where the at least one encoder data stream corresponds with the refined cell collection and the updated search constraints; fetch the identified DGGS values; perform DGGS operations on the DGGS values to generate refined aggregated spatial statistics; and display the resulting collection of cell values and resulting aggregated spatial statistics in at least one of the DGGS legend and at least a portion of the DGGS globe.

In at least one embodiment, wherein the client terminal is configured to generate a refined cell collection by sub-selecting cells using DGGS operations on data values associated with the cell collection and/or the aggregated spatial statistics; perform DGGS operations on the DGGS values to generate refined aggregated spatial statistics; and display the resulting collection of cell values and resulting aggregated spatial statistics in at least one of the DGGS legend and at least a portion of the DGGS globe.

In at least one embodiment, the system comprises a data stream decoder for transforming data streams to formats that can be read and displayed at the client terminal.

In at least one embodiment, the at least one controller is configured to: identify the at least one encoder data stream, fetch the identified DGGS values and perform the DGGS operations to generate the aggregated spatial statistics; and send a data stream comprising indices of the resulting collection of cells and the aggregated spatial statistics to the client terminal.

In at least one embodiment, the system further comprises an encoder that is associated with the identified at least one encoder data stream and the encoder is configured to: receive cell indices for the resulting collection of cells; fetch the identified DGGS values; calculate the aggregated spatial statistics on the DGGS values in the identified at least one encoder data stream; and send a data stream comprising indices for the resulting collection of cells and the aggregated spatial statistics to the client terminal.

In at least one embodiment, the system further comprises an encoder that is associated with the identified at least one encoder data stream and the encoder is configured to: receive cell indices for the resulting collection of cells; fetch the identified DGGS values; send a data stream comprising indices for the resulting collection of cells and the identified DGGS values to the client terminal; and the client terminal is configured to calculate the aggregated spatial statistics on the DGGS values in the identified at least one encoder data stream and display the resulting collection of cell values and resulting aggregated spatial statistics in at least one of a DGGS legend and at least a portion of the DGGS globe.

In at least one embodiment, for adding an additional geospatial data source, at least one of the at least one controller, the client terminal or an encoder associated with the additional geospatial data source is configured to: locate the additional geospatial data source; and extract, record, and encode geospatial data from the additional geospatial data source, and wherein, the encoded geospatial data is registered at the controller.

In at least one embodiment, the resulting collection of cells and the resulting aggregated spatial statistics are registered with the at least one controller and shared for use by other client terminals.

In at least one embodiment, the system comprises a network of DGGS globe nodes wherein a first node comprises a client terminal and an encoder so that the first node acts as a geospatial data source and another client terminal can discover the geospatial data of the first node.

Other features and advantages of the present application will become apparent from the following detailed description taken together with the accompanying drawings. It should be understood, however, that the detailed description and the specific examples, while indicating preferred embodiments of the application, are given by way of illustration only, since various changes and modifications within the spirit and scope of the application will become apparent to those skilled in the art from this detailed description.

BRIEF DESCRIPTION OF THE DRAWINGS

For a better understanding of the various embodiments described herein, and to show more clearly how these various embodiments may be carried into effect, reference will be made, by way of example, to the accompanying drawings which show at least one example embodiment, and which are now described. The drawings are not intended to limit the scope of the teachings described herein.

Figure 1:
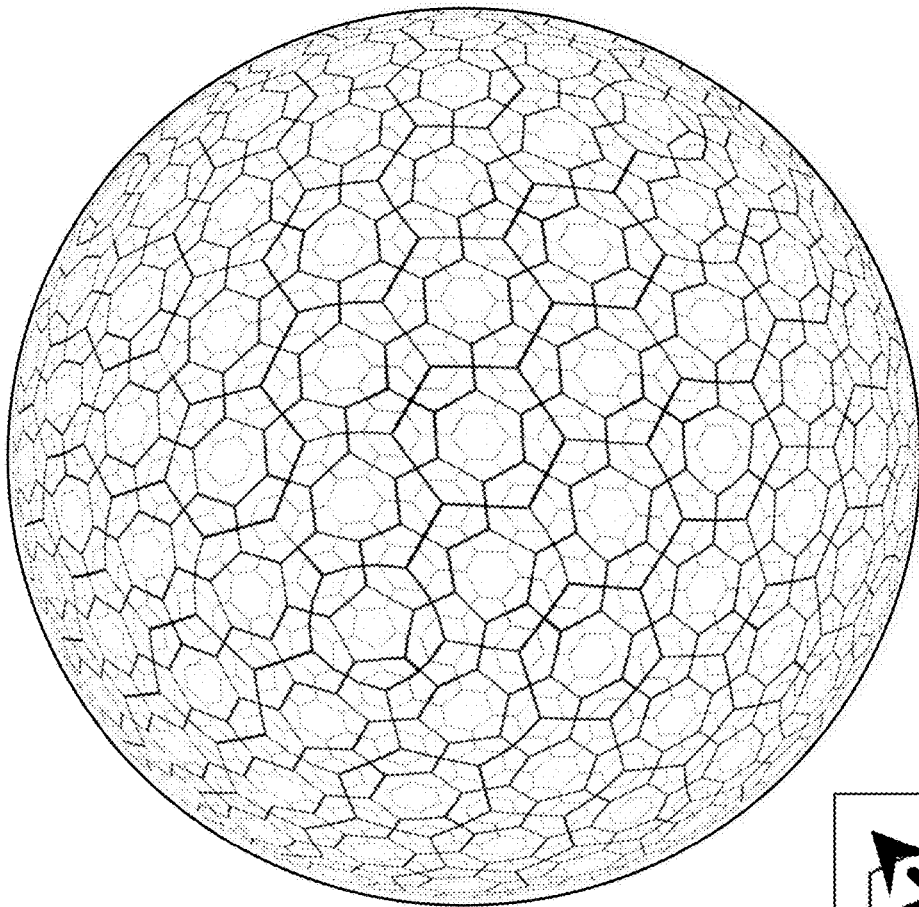
FIG. 1 shows a graphical representation of a DGGS.
Figure 1:
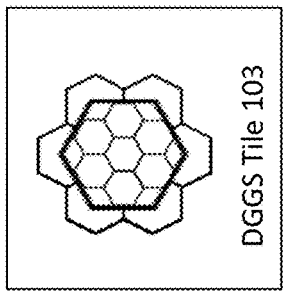
Figure 1:
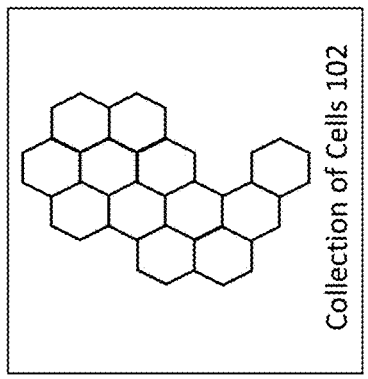
Figure 1:
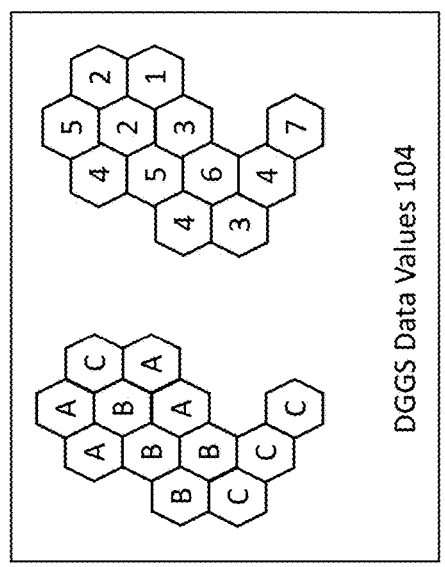
Figure 1:
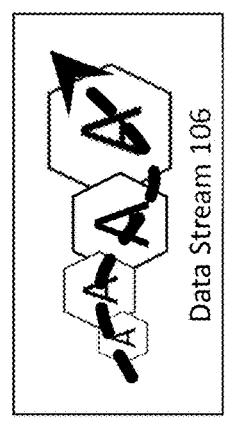
Figure 1:
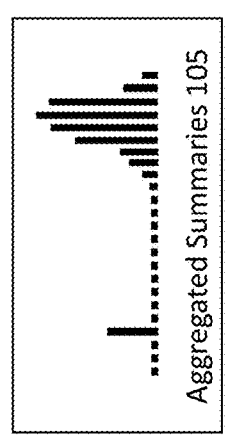

Further aspects and features of the example embodiments described herein will appear from the following description taken together with the accompanying drawings.

DETAILED DESCRIPTION OF THE EMBODIMENTS

Various embodiments in accordance with the teachings herein will be described below to provide an example of at least one embodiment of the claimed subject matter. No embodiment described herein limits any claimed subject matter. The claimed subject matter is not limited to devices or methods having all of the features of any one of the devices or methods described below or to features common to multiple or all of the devices and or methods described herein. It is possible that there may be a device or method described herein that is not an embodiment of any claimed subject matter. Any subject matter that is described herein that is not claimed in this document may be the subject matter of another protective instrument, for example, a continuing patent application, and the applicants, inventors or owners do not intend to abandon, disclaim or dedicate to the public any such subject matter by its disclosure in this document.

It will be appreciated that for simplicity and clarity of illustration, where considered appropriate, reference numerals may be repeated among the figures to indicate corresponding or analogous elements or steps. In addition, numerous specific details are set forth in order to provide a thorough understanding of the example embodiments described herein. However, it will be understood by those of ordinary skill in the art that the embodiments described herein may be practiced without these specific details. In other instances, well-known methods, procedures and components have not been described in detail so as not to obscure the embodiments generally described herein. Furthermore, this description is not to be considered as limiting the scope of the embodiments described, but rather as merely describing example implementations of various embodiments.

It should also be noted that the terms "coupled" or "coupling" as used herein can have several different meanings depending in the context in which these terms are used. For example, the terms coupled or coupling can have a mechanical, or electrical connotation. For example, as used herein, the terms coupled or coupling can indicate that two elements or devices can be directly connected to one another or connected to one another through one or more intermediate elements or devices via an electrical signal or a mechanical element, depending on the particular context.

It should also be noted that, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

It should be noted that terms of degree such as "substantially", "similarly", "about" and "approximately" as used herein mean a reasonable amount of deviation of the modified term such that the end result is not significantly changed. These terms of degree may also be construed as including a deviation of the modified term, such as 1%, 2%, 5%, or 10%, for example, if this deviation does not negate the meaning of the term it modifies.

Furthermore, the recitation of numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed, such as up to 10%, for example.

The example embodiments of the systems or methods described in accordance with the teachings herein may be implemented as a combination of hardware and software. For example, the embodiments described herein may be implemented, at least in part, by using one or more computer programs, executing on one or more programmable devices comprising at least one processing element, and at least one data storage element (including volatile and non-volatile memory and/or storage elements). These devices have input devices such as, but not limited to, one or more of a keyboard, a mouse, a touch screen and the like, as well as a display screen and possibly other output devices such as a printer, and the like.

It should also be noted that there may be some elements that are used to implement at least part of the embodiments described herein that may be implemented via software that is written in a high-level procedural language such as object oriented programming. The program code may be written in C, C++ or any other suitable programming language and may comprise modules or classes, as is known to those skilled in object oriented programming. Alternatively, or in addition thereto, some of these elements implemented via software may be written in assembly language, machine language or firmware as needed. In either case, the language may be a compiled or interpreted language.

At least some of these software programs used to implement the various embodiments described herein may be stored on a storage media (e.g. a computer readable medium such as, but not limited to, ROM, magnetic disk, optical disc) or a computing device that is readable by a general or special purpose programmable device having a processor, an operating system and the associated hardware and software that is necessary to implement the functionality of at least one of the embodiments described herein. The software program code, when read by the computing device, configures the computing device to operate in a new, specific and predefined manner in order to perform at least one of the methods described herein.

Furthermore, at least some of the programs associated with the systems and methods of the embodiments described herein may be distributed in a computer program product comprising a computer readable medium that bears computer usable instructions, such as program code, for one or more processors. The medium may be provided in various forms, including non-transitory forms such as, but not limited to, one or more diskettes, compact disks, tapes, chips, and magnetic and electronic storage devices. In alternative embodiments, the medium may be transitory in nature such as, but not limited to, wire-line transmissions, satellite transmissions, internet transmissions (e.g. downloads), media, digital and analog signals, and the like. The computer useable instructions may also be in various formats, including compiled and non-compiled code.

The Basics of Discrete Global Grid System

A Discrete Global Grid System ("DGGS") is formally defined and described by the Open Geospatial Consortium in their DGGS Abstract Standard as comprising cell structure, unique identification and ordering, quantization and encoding of data values, and associated mathematical operations. The OGC DGGS Abstract Specification Standard is publically available at http://www.opengeospatial.org/standards and is incorporated herein by reference. A graphical representation of a DGGS 101 is shown in FIG. 1, to depict and encompass any discrete global grid structure, as well as the associated encoding, data values, and operations, an example of which includes, but is not limited to, the DGGS described in Applicant's U.S. Pat. No. 8,400,451, which is hereby incorporated by reference.

Collection of Cells

As depicted herein, the equal area cells of a DGGS 101 can be selected and/or grouped into a collection of cells 102 by various means described in further detail below.

Multi-Resolution Hierarchy

The DGGS 101 comprises a hierarchical collection of contiguous data cells—a refinement of ever higher resolution tessellations representing smaller physical areas that form a hierarchical nesting of cells. A refinement of a single parent cell into finer resolution child cells result in a DGGS tile 103. A collection of cells 102 at one resolution of cell area can thereby resolve into finer and finer cells and represent finer resolutions having smaller areas using collections of DGGS tiles 103. Accordingly, it should be understood that the expression "finer and finer cells" or "finer resolution child cells" means that a larger cell is broken up into a collection of smaller cells that are contained within the larger cell or over overlap with the larger cell (an example of the overlap is shown in FIG. 1 for the DGGS tiles 103).

Unique Indexing

Each cell in a DGGS 101 is labelled with a unique numerical identification that addresses its location and implies the hierarchical parent-child and algebraic neighbour relationships with other DGGS cells. These indices thereby form a linear ordering for collections of cells 102 and DGGS tiles 103 that can be efficiently serialized and compressed through various coding techniques such as run-length-encoding, for example. Some DGGS encodings, such as those described in Applicant's U.S. Pat. No. 8,400,451, are structured so their index prefix can be compared for fast look up and Boolean operations and to converge monotonically with each resolution refinement.

Figure 2:
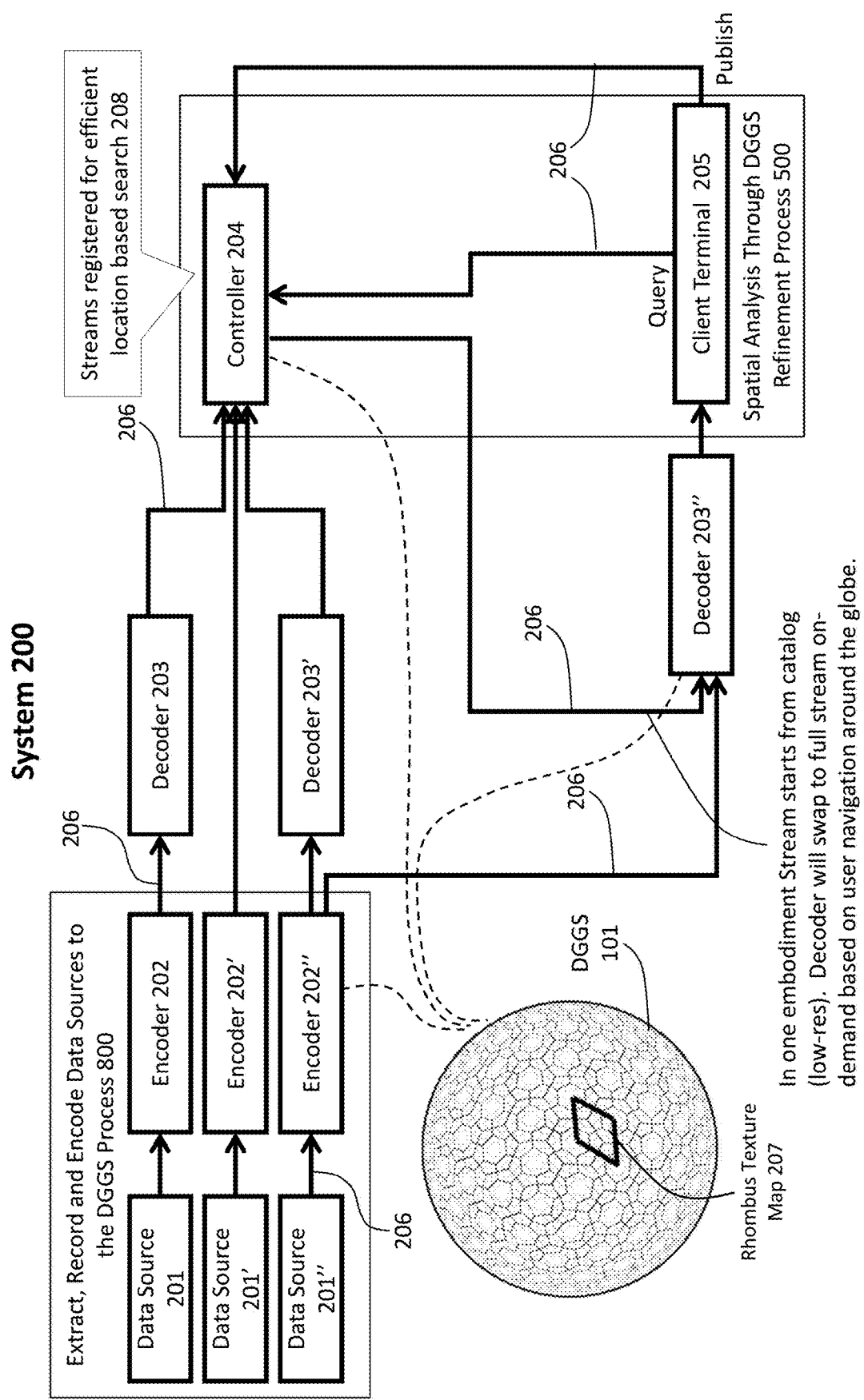
FIG. 2 shows an example embodiment of a system for automating and simplifying the spatial analysis workflow and implementing, without collocation, federating geospatial data from disparate geospatial data sources and, virtualizing the geospatial data analysis process in accordance with the teachings herein.

As provided herein, the index and ordering of DGGS cell collections 102 and DGGS tiles 103 can be efficiently channeled from one system component to another system component as nodes in a distributed DGGS network as shown as an example in FIG. 2 where system 200 has components 202, 203, 204, and 205. As these encodings of DGGS cells identify discrete units of location they can be used to define spatial extents within SQL or noSQL databases and for search engine technologies for the purpose of horizontal partitioning, scaling, geohashing, and sharding. Geohashing is a hierarchical spatial data structure where space is divided into different shape regions in a grid. Sharding is a type of database partitioning used to separate larger databases into smaller parts called data shards that can be more easily managed with faster processing.

Data Values in Cells

Figure 8:
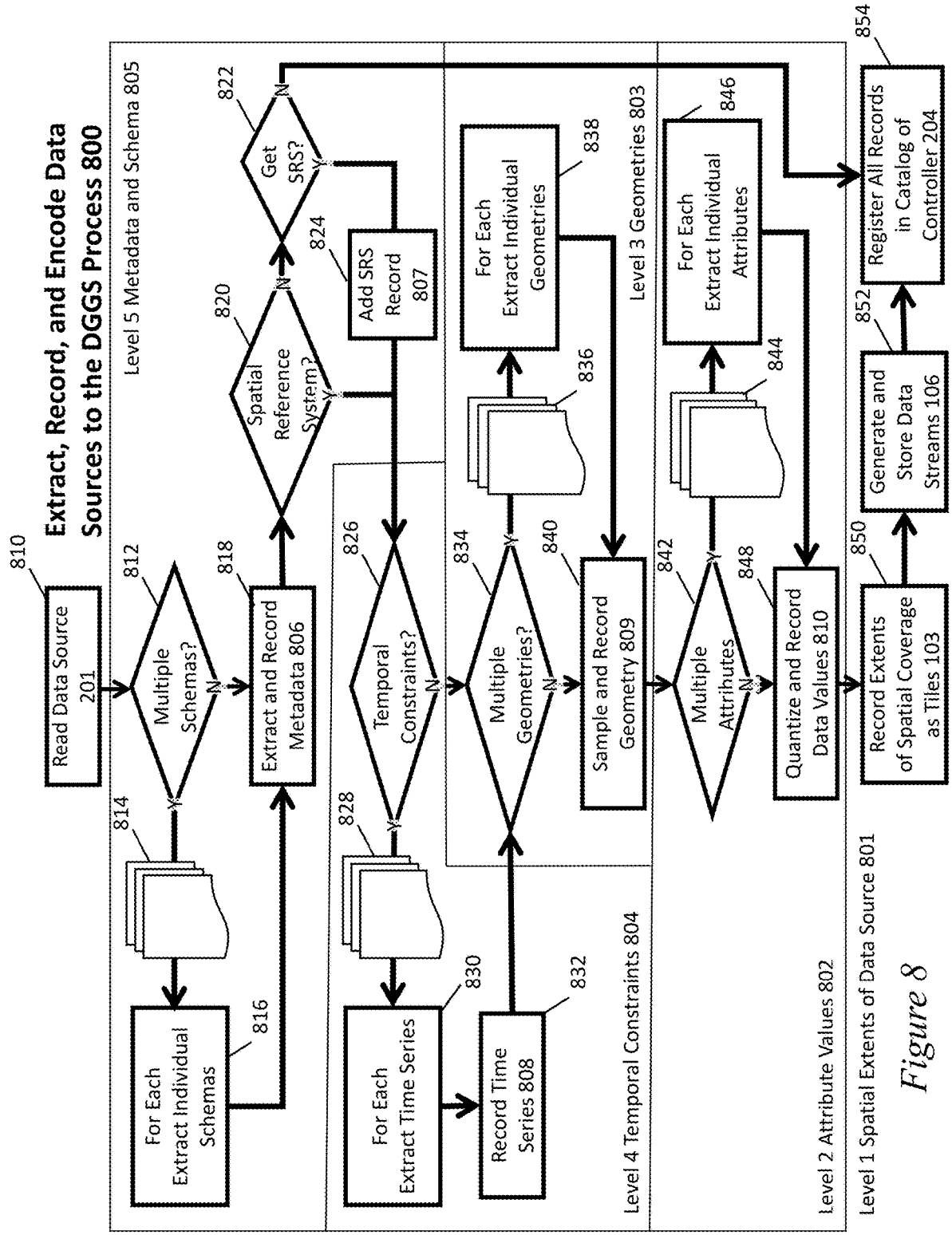
FIG. 8 shows a flowchart of an example embodiment of a method for transforming data from a data source into a standard format based on a unified model.

As provided herein, data values from many distributed and various types of any geospatial data source (i.e. GIS data source) can be quantized and sampled to specific cells that correspond to the overall geometry of the original data source to form feature or thematic based cell collections containing geospatial cell values 104 (also referred to as DGGS data values 104). The source geospatial data may be in the format of vector features, raster coverages, tabular lists and other data that has geospatial reference as discussed in Applicant's U.S. Pat. No. 8,400,451. However, as the grid cells of various resolutions are aligned, the geospatial cell values 104 for a given DGGS cell are automatically aligned and thus fused or integrated with all other values sampled into the given DGGS cell. An example of a method 800 for performing this alignment is shown in FIG. 8. When a value is sampled 808 and quantized into a cell 809 it means that the value is applicable to the physical area represented by the cell and so the value is associated with the cell.

The hierarchical nesting DGGS tiles 103 allow for efficient aggregation and decomposition of these data values 104 which can be further represented by calculated transformations, statistics, wavelet transforms, and distributions (such as but not limited to histogram or frequency, for example) that characterize the data values through aggregated summaries 105. For example, this may be accomplished using systems and methods for managing large volumes of data in a digital Earth environment, such as is described in Applicant's U.S. Pat. No. 9,600,538, which is hereby incorporated by reference. The progressive transmission and reception of DGGS data values 104 and/or summaries 105 encoded to DGGS tiles 103 is herein referred to as data streams 106 (also known as geopackets). The data values 104 can represent different attributes for the associated collection of cells 102. As an example, in FIG. 1, the data values 104 on the left represented by letters may be towns and the data values 104 on the right represented by numbers may be elevations.

Putting it all Together for Display

As provided herein, the formation, ordering, and encoding of the collection of DGGS cells 102 and DGGS tiles 103 together with the data values 104 and/or their aggregated summaries 105 can be used to characterize the location, geometry, and attribution of real-world phenomena at various details, spatial scales and locations which can be represented on a DGGS globe 301 of a graphical user interface 300, according to at least one embodiment described herein. In particular, the DGGS globe 301 comprises contiguous visual cells, shown as hexagons on its surface, in this example, to which the data values 104 are associated. Accordingly, the DGGS globe 301 provides a visual representation of the DGGS geospatial data and can include associated statistics based on queries from users. As examples, an area marked as a forest can be displayed using a color such as green or 3D models of trees can be generated on that same area, a mesh can be drawn on the terrain to represent elevation, and other elements can be displayed such as annotations indicating the land type, icons of buildings, lines for roads and clouds representing weather data. Measurements like gross domestic product or education level, which do not represent physical objects, can be displayed as bars or icons.

As used herein, the "discrete global grid system" 101 is used to describe a DGGS data structure, whereas the term "DGGS globe" 301 is used to describe a visual representation of the DGGS, such as may be displayed on a screen or display of any computing device, such as, but not limited to, a desktop computer, a laptop, a tablet or a mobile device, for example. There is a one to one correspondence between the hierarchical collection of contiguous data cells, shown as DGGS 101—and its component cell collections 102, DGGS tiles 103, data values 104 and aggregated data summaries 105—within the DGGS globe 301 of the graphic user interface 300 shown in FIG. 3.

DGGS Operations

Figure 5:
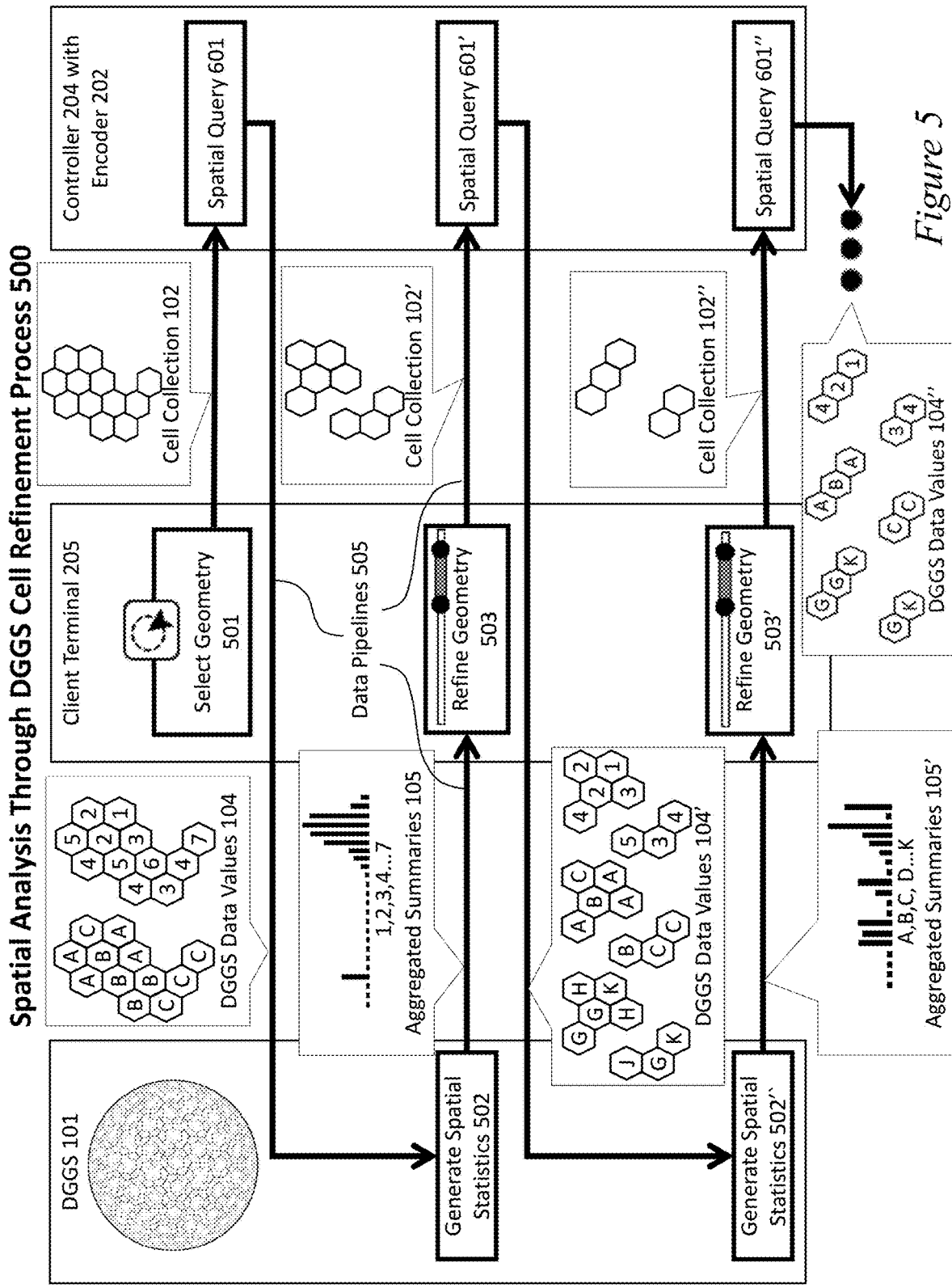
FIG. 5 shows a flowchart and diagrams representing results from certain actions in the flowchart for an example embodiment of a method for performing distributed spatial analysis using a DGGS in accordance with the teachings herein.

The uniform discrete structure of the DGGS 101 provides opportunities to simplify many standard spatial operations such as:

Efficiency is gained as expressions and algorithms can be created to operate on the grid structure of the DGGS 101 and data values 104 held there independent of various conventional data sources from which the data may have originally been obtained;

Spatial queries are primarily simple, efficient set theory operations;

Multi resolution characteristics of the DGGS 101 allow for progressive refinement of spatial queries;

Topological relationships between two regions represented as two different collections of cells 102 can be described within an efficient binary matrix (as an example Dimensionally Extended 9 Intersection Model);

As each cell of a DGGS is equal area, spatial statistics 105 on aggregated cell values 104 are uniformly generated independent of location (an example which is shown along with act 502 of method 500 in FIG. 5);

Predictive modelling techniques such as, but not limited to, finite element, agent based and cellular automaton can use the DGGS multi-resolution grid structure.

Basic DGGS operations that utilize these characteristics and may be used within the DGGS 101 in accordance with the teachings herein include, but are not limited to:

Iterations—Operations that traverse over DGGS cell indices and extend to iterate over the set of all cells in a given geometry and result in identified real-world cell locations and these iterations include but are not limited to:
Nearest neighbor;
Parent/child, and
Over a geometric shape;

Computations—Operations that map one or more values, modify at least one existing value, or add at least one new value to a cell resulting in cell data values 104 and these operations include but are not limited to:
Selections of cells from user input;
Sampling and Quantization;
Arithmetic Calculations and Algebraic Expressions;
Mathematical Morphology;
Convolution Filters; and
Multi-Resolution Spatial Analysis Process;

Selections—Operations that generate or filter a collection of cells 102, and, when including the hierarchy of DGGS tiles to a given resolution 103, result in a new geometry and these operations include and are not limited to:
Conversion from conventional geographic coordinates, labels, or addressing;
User Selected new geometries;
New geometries Implied by Indexing;
New geometries defined by Algebraic operations on Indexing;
New geometries defined by Boolean operations on data values 104 and summaries 105;
New geometries defined by applying an Algorithm on data values 104 and summaries 105
New geometries defined by Buffering;
New geometries defined by Connectivity Table;
New geometries defined by Set Theory & Topological Relationships;
New geometries defined by Point Analysis; and
New geometries defined by Image Segmentation;

Aggregated Summaries—Operations that characterize or reduce all the data values 104 within a collection of cells 102 and result in an aggregated characteristic or data summary 105 which include but are not limited to:
Spatial Statistics;
Derivatives;
Histograms; and
Frequency Transformations.

The System

Referring now to FIG. 2, there is shown a system 200 to automate and simplify the spatial analysis workflow and provide distributed spatial processing and analysis on distributed data sources that may be located remotely from one another and connected to each other via a network, such as, but not limited to, the Internet, for example. In particular, the system 200 provides, without collocation, a method to federate geospatial data from disparate geospatial data sources 201, which means making the spatial references all of these data sources contain into a joinable relational object with the common grid structure of DGGS cells (as opposed to coordinate points with no implied physical extent), virtualize the geospatial data analysis process, and display the resulting geospatial data and aggregated spatial statistical summaries on a DGSS globe 301 and the legend of the graphic user interface 300.

The main types of components in the system 200 comprise a DGGS decoder 203, a controller 204, a client terminal 205, and various DGGS encoders 202. There are multiple instances of data sources 201, encoders 202 and decoders 203 since these elements can be physically distributed and be remotely located throughout the system 200. There can be multiple different data sources 201 indicated by data sources 201' and 201" as well as multiple encoders 202 as indicated by encoders 202' and 202" and multiple decoders as indicated by decoders 203'; and 203". In at least one embodiment, there can be at least one of more than three data sources 201, more than three encoders 202 and more than three decoders 203. Also, although just one client terminal 205 is shown in FIG. 2, it should be understood that there can be many client terminals (i.e. many users) who can access the system 200 to perform distributed geospatial analysis although just one client terminal 205 is shown for ease of illustration.

The controller 204 which includes a rights management server (for performing the digital rights management as described in further detail below) and the catalog can also be composed of many nodes. The controller 204 can be scaled and distributed by sharding like other databased technologies such as, but not limited to, MongoDb, and ElasticSearch for example. The controller operations can also be federated over several controllers, for example two organizations can each have a controller 204. A client terminal 205 can then connect to both controllers and send spatial queries 601 to both of the controllers and merge the results received from both of the controllers and/or each controller 204 can send different spatial results, and will share different access tokens so that the client terminal 205 can access different encoders 202. When the client terminal 205 receives two access tokens to the same encoder 202, the user of the client terminal 205 can be prompted to choose between one of the access tokens depending on the particular rights that are granted by each access token. For example, one access token may provide 1 GB of credit so the user at the client terminal 205 can choose to use those credits now or not.

In systems where there can be two or more controllers, the user of the client terminal 205 is prompted, upon requesting spatial data from a particular data source 305 or when sending a spatial query 601, to choose which controller node to use if there is more than one controller node that they have permission to access. Similarly, when publishing, the client terminal 205 can prompt the user to select which of the controller nodes the user has access to register a data source to.

Figure 4:
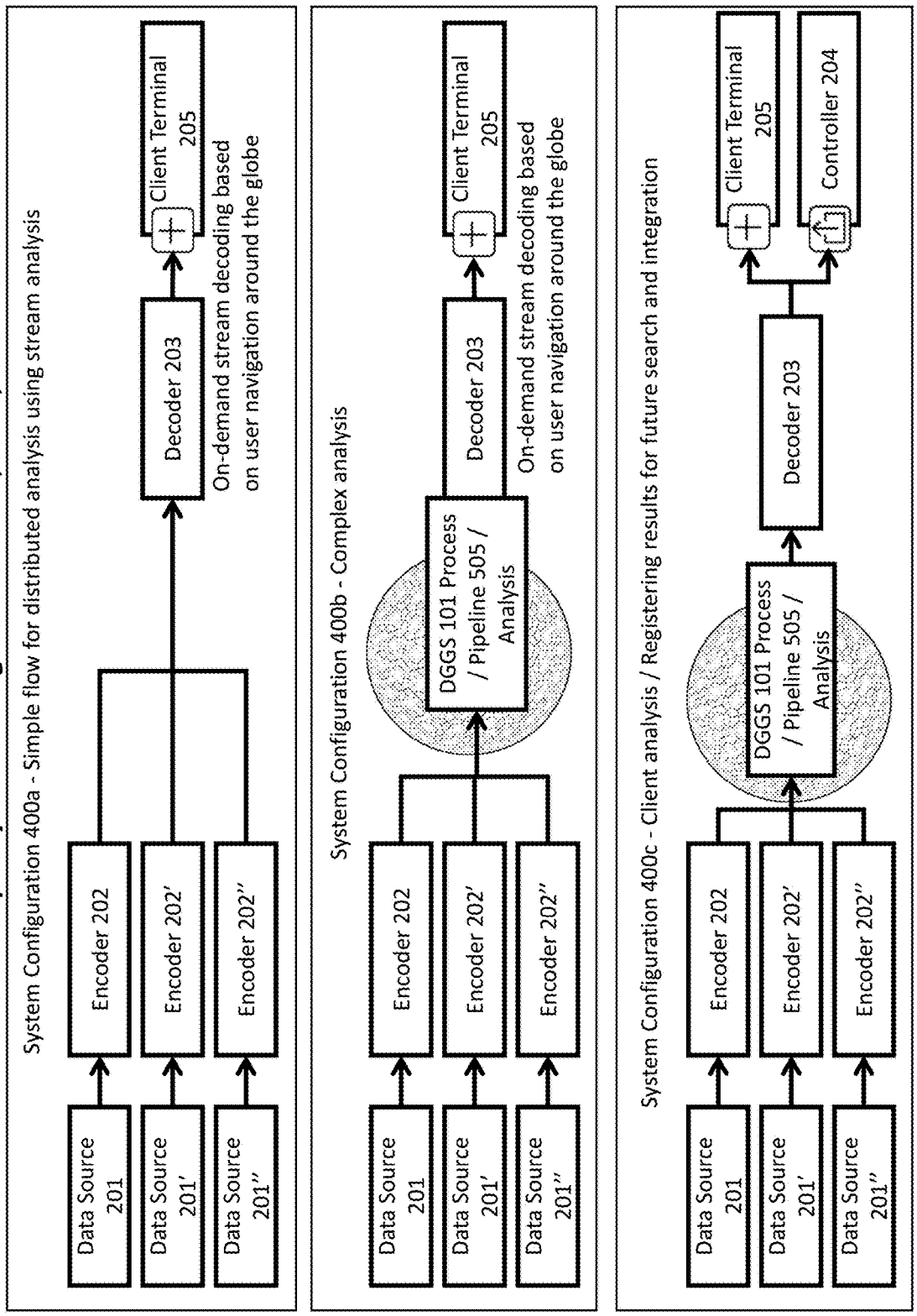
FIG. 4 shows several embodiments of different component layouts in the implementation of the system of FIG. 2.

The layout of components shown in FIG. 2 is a general one and is meant to be provided as one example. Many other layouts are possible and some other example embodiments are shown in FIG. 4.

The stippled lines from the DGGS 101 indicate capabilities that can be drawn from the DGGS operations described previously, and used by the system 200, including further sequencing and combinations of these basic operations for more complex operations, through computer code or instructions by at least one appropriate component in the system 200.

In the example embodiment provided in FIG. 2, the DGGS encoder 202, the decoder 203, the controller 204, and the client terminal 205, can comprise any type of networked computer (e.g. any networked computing device) that holds or connects to sources of conventional geospatial data sources 201, such as high power computer, a virtual machine, desktop computers, mobile devices, servers, tablets and laptops.

Encoder

A DGGS encoder 202 is a server that can take conventional geospatial data sources 201 and process them into a collection of DGGS cells 102, DGGS tiles 103, together with the data values 104 and/or the aggregated data summaries 105. The results of the processing can be stored as data tiles along with associated data values and transmitted as data streams 106 as illustrated in an example of this process in FIG. 8. The data stream 106 includes identifiers for the DGGS tiles 102 and data values for the aggregated data summaries 105. Since the data values are associated with the cells and the cells can be refined from coarse to fine over time, the data values can also stream from coarser (e.g. summaries of average house price) to finer detail (e.g. individual actual house price) in the data stream over time. This is illustrated schematically in data stream 106 of FIG. 1 as the initial data values that are streamed (e.g. at the right end of the illustrated data stream) are coarser values that are associated with coarser, larger sized cells, and the subsequent data values that are streamed (e.g. moving left along the illustrated data stream) are finer more precise values that are associated with finer, smaller sized cells. The encoder 202 can make use of the DGGS 101 to perform operations, as can other components of system 200, that can be recorded as a chain of process elements called a data pipeline 505.

These results can also be indexed and registered with metadata, geometries, and attribute data values of the conventional geospatial data sources 201 to the catalog of the controller 204. The encoder 202 organizes the data of all different formats and types into a unified model that separates the data into basic defining components. The unified model allows for the classification of different data formats and geospatial data files into a singular view of geospatial data. An example of a method 800 to extract, encode and register data sources to the DGGS 101 where data sources 201 are opened and processed according to one example of a unified model with 5 levels of separation is shown in FIG. 8 where Level 1 are the Spatial Extents of Data Source 801, Level 2 are the Attribute Values 802, Level 3 are the Geometries 803, Level 4 are the Temporal Constraints 804 and Level 5 are common Metadata and Schema 805. The resulting records are registered into the catalog database of a controller 204 and geometries are organized into data streams 106. When geospatial data sources are combined using the unified model, the geospatial data of these geospatial data sources that correspond with a particular level of the unified model may be merged with one another. By using the unified model to combine the geospatial data from different geospatial data sources, various DGGS operations on the geospatial data such as searching, selecting, and/or analysis can be implemented more efficiently.

Referring now to FIG. 8, shown therein is a flowchart of an example embodiment of a method 800 for transforming different types of spatial data from a spatial data source into a standard format based on a unified model.

At act 810, spatial data from a spatial data source 201 is read. At act 812, it is determined whether there are multiple schemas (i.e. multiple data types) for the spatial data read at act 810. If the determination at act 812 is true, then the method 800 proceeds to act 814 where data records having the multiple schemas are obtained from the data source 201. The method 800 then proceeds to act 816 where individual schemas are then extracted from each of the data records obtained at act 814 and the method 800 proceeds to act 818. If the determination at act 812 is false, then the method 800 proceeds to act 818 where metadata is extracted. The extracted metadata and schema are recorded (i.e. stored) at the catalog of the controller 204 as part of Level 5 spatial data for metadata and schema as per this particular example of the unified model.

A single schema means a collection of data such as attributes and metadata that may be specified in a file for a particular spatial object. For example, the object may be a road network. In some cases, there are some data formats that need several files to define a schema; an example of this is a GIS file called Shapefile. Alternatively, a single file may hold various schemas—an example might be an AutoCAD file that may describe a road network, property fabric, and sewers system all in one file. Another example is when a single entity, not a file, may address many schemas such as a catalog or a folder on a computer or an ftp site or an OGC service. There are some cases where there are file types that are files of files like a GDB file. Regardless of how the schema is stored, the data is separated into single schemas and each record can have metadata including spatial reference system, time, geometries, attributes, and spatial extent.

At act 820, the method 800 determines if the spatial data read at act 810 includes a spatial reference system (SRS). If the determination at act 820 is true the method 800 proceeds to act 822 where it is determined whether the SRS is obtained from the read spatial data. This may be done when the SRS of the read spatial data is not already recorded in the catalog. If the determination at act 822 is true, then the obtained SRS is added to the spatial data stored at the catalog and the method 800 proceeds to act 826. If the determination at act 822 is false then method 800 proceeds to act 854.

At act 826, the method 800 determines whether there are any temporal constraints for the spatial data read at act 810 (e.g. the spatial data only covers a certain time period from time A to time B). If the determination at act 826 is true, then the method 800 proceeds to act 828 where data records having time series information are obtained from the data source 201. The method 800 then proceeds to act 830 where time series data are extracted from each of the data records obtained at act 828. The method 800 then proceeds to act 832 where the extracted time series data are recorded at the catalog of the controller 204 as part of Level 4 spatial data for temporal constraints as per this particular example of the unified model. If the determination at act 826 is false, then the method 800 proceeds to act 834.

At act 834, the method 800 determines whether there are multiple geometries for the spatial data read at act 810 (e.g. a data source has multiple objects represented by multiple geometries). If the determination at act 834 is true the method 800 proceeds to act 836 where data records having different geometries are obtained from the data source 201. The method 800 then proceeds to act 838 where the individual geometries are extracted for each data record obtained at act 836. The method 800 then proceeds to act 840. If the determination at act 826 is false, then the method 800 proceeds to act 840 where the extracted one or more geometries are recorded at the catalog of the controller 204 as part of Level 3 spatial data for geometries as per this particular example of the unified model.

At act 842, the method 800 determines whether there are multiple attributes for the spatial data read at act 810. For example, for a given spatial object, there may be data on various attributes of the spatial object. For example, if the spatial object was a house, the attributes may include one or more of the house address, the house price, and the number of people inhabiting the house. If the determination at act 842 is true the method 800 proceeds to act 844 where data records having the multiple attributes are obtained from the data source 201. The method 800 then proceeds to act 846 where the multiple attributes are extracted for each data record obtained at act 844. The method 800 then proceeds to act 848. If the determination at act 842 is false, then the method 800 proceeds to act 848 where the attributes are quantized and recorded at the catalog of the controller 204 as part of Level 2 attribute values 802 as per this particular example of the unified model.

At act 850, the method 800 comprises recording the extents of spatial coverage as tiles 103. The term record means that spatial data is being organized (i.e. built) according to the unified model. At act 852, the method comprises generating data streams 106 based on the records that are organized according to the unified model and storing the generated data streams 106 in a data store associated with the encoder 202. At act 854, the generated data streams can be sent to the controller 204 where the records are registered to respond to current or future spatial queries from the client terminal 205.

It should be noted that the process 800 can be performed in advance of a spatial query so that the controller 204 can obtain spatial data at the catalog to respond to a spatial query form the client terminal. Alternatively, the process 800 can be performed in real time (e.g. "on the fly") to process particular spatial data from a spatial data source in order to respond to a spatial query from the client terminal because the particular spatial data was not stored on the catalog before the controller received the spatial query.

Decoder

A DGGS decoder 203 is a server that can take one or many data streams 106 and combine (i.e. integrate, fuse) them through DGGS 101 operations, and transform them into optimized formats readily accessible and digestible by the client terminal 205; these formats include, but are not limited to, graphics mesh, texture map, data tables, text, images, and the like. For example, DGGS tiles are not always readable by conventional web applications. The decoder 101 can efficiently transform DGGS data into products that can be presented and interpreted as a response to a geospatial enquiry to complete the request. As an example a hexagonal DGGS tile can be transformed into a rectilinear rhombus texture map 207, sent in a common .png format, and use UV axis coordinates to address rhombus tiles that cover the DGGS 101. Similarly, the centroids of the DGGS tiles can be joined into hierarchical triangles by the decoder 203 and sent to the client terminal 205, along with data such as elevations, to form a graphic mesh that forms a terrain.

The DGGS decoder 203 can be configured to perform various DGGS 101 operations (some of which are listed in the DGGS operations section described above and in sections of the DGGS standard) to align, integrate, and manage multiple resolutions of DGGS encoded data streams 106.

Client Terminal

The client terminal 205 is a computer device that can use software technologies, standards, and platforms that permit network interconnection, data access, file input/output, computational instructions, graphics rendering, and display of graphics and data. A user will use the client terminal 205 to interact with the system 200 and the graphical user interface 300 in order to select regions on the DGGS globe 301 and/or submit queries and perform spatial analysis as will be described in further detail with respect to FIGS. 5 and 6. Although the client terminal 205 is used to implement a graphics interface, the client terminal 205 can also act as an API terminal that can allow others systems and network entities to communicate with it.

Controller

The computing network implementing the system 200 may be managed and maintained by the controller 204, which can be implemented using one or more servers, that organizes the various network components—from major elements down to individual data entries—so that data can be efficiently discovered, as well as ensures proper credentials are provided in respect of being able to access and manage DGGS tiles 103, data values 104, and geospatial data streams 106. The controller 204 also facilitates messaging between the nodes of the system 200, as well as performs caching, digital rights management, and data transactions. In some embodiments, the system 200 may include two or more controllers 204 that can communicate between themselves to allow, as an example, a private network to gain access to another private network if permitted, and also to a public network.

In at least one embodiment, the controller 204 can also be configured to use well known methods for digital rights management for the various geospatial data sources and provide certain rights to the different components of the system 200 including the right to select, analyze, export, and transmit analyzed results over the network. The rights may be expressed as a license agreement that end users must agree to before gaining access to geospatial data. The rights may also include an expiration date that is enforced by the controller 204 which can send notices of renewal to the different components of the system 200 that want to access certain data sources. The controller 204 may have the ability to grant access to multiple data sources that are provided by multiple owners of the data sources who require different licensing agreements. In the case of multiple or derived data sources, the licensing rights of the individual data sources can be chained together so as to not violate the rights permitted on each individual source.

For example, the controller 204 can add a signed token to any requested transaction on the network of system 200. The encoder 202 can validate the right of a request from a client terminal 205 to access the data records and data streams 106 that can be provided by the encoder 202. Moreover, in at least one embodiment, the signed token can also contain permissions for what type of data and the amount of data that the client terminal 205 is allowed to access. For example, the signed token can contain permissions that limit the granularity of data that may be accessed from entire holdings to a specific attribute value, and similarly limit the spatial extents of data that can be accessed both in terms of area and resolution for certain levels of cell collections 102. These permissions can be further limited in terms of providing permissions to allow for one or more of the following rights: data access, data viewing, data editing, or data republishing. The encoder 202, as a node in the system 200, can also use the permission that is specified by the signed token to modify the data stream using certain DGGS 101 operations. For example, in some embodiments if the signed token includes an encoder public key, the encoder 202 can sign the data to indicate that it is authentic data and avoid fraud. Alternatively, or in addition thereto, if the public key of a particular decoder is provided to the encoder 202 then the encoder can encrypt the data before it is sent as a data stream so only that particular decoder can decrypt the data in the data stream.

The controller 204 comprises a catalog along with a data store. The catalog organizes the description of known geospatial data sources 201 as described in detail for one example embodiment in FIG. 8. In some cases data that have no spatial reference system, such as the metadata that describes a document, can later be processed (e.g. act 807 of method 800) to have a spatial reference system added to it to geospatially locate it to the DGGS. The catalog of the controller 204 contains the data records 801, 802, 803, 804, and 805 that have been extracted from the data source 201 by the encoder 202, using for example the process 800 shown in FIG. 8, and combined. The combined data can be used to form a spatial query 601 by providing data for which searching and filtering can be performed based on at least one of keywords, metadata, attributes, attribute values, search strings, spatial extents, and location. The controller 204 (as can the encoder 202 and the decoder 203) can also be configured to encapsulate or aggregate different data sources into a single coherent reference document of the combined data and data streams as a data pipeline 505 as shown by some examples in FIG. 4. A data pipeline 505 is a record of all of the DGGS 101 operations and processes that have been applied to the original data sources such as the original sampling and quantization of data from these different data sources into the DGGS format, combining data from different data sources into data streams, transforming the data values or geometries (which is typically stored in an XML document) and sharing the data values or geometries.

For example, a user can find all geospatial data sources processed by the encoder 202 that have a data type associated with elevation (i.e. data-type filters), for Canada (i.e. spatial filters) between the years 2000 and 2010 (i.e. temporal filters) that have been published by National Resources Canada (NRCAN) (i.e. metadata filters).

In another example, multiple data sources can be aggregated in the catalog of the controller 204, such as when a query is sent to the catalog for "the price of milk in Africa". In this example, there may be no single authority for Africa. However, it can be assumed that each country and/or city in Africa may have its own local data source for the price of milk. Therefore, the controller 204, along with the decoder 203, can perform DGGS operations 101 to aggregate all of the datasets into a single data pipeline 505 that will take into account the temporal aspects of each data source, and then adjust values, for example, based on different currencies. This DGGS 101 operation can be referred to as a "mosaic" or "conflation" operation.

In addition, the controller 204 is optimized to carry out spatial queries, which will be discussed with respect to spatial queries 601, 601' and 601" shown in FIGS. 5 and 6. For example, the description of a collection of cells 102 can be sent to the controller 204, which is then able to find data sources with matching cells 102 and DGGS tiles 103 and data sources 201 that contain corresponding data values 104, and conversely, the controller 204 can manage a query for certain attribute values 104 or statistics 105 and return known data sources 201 and the spatial extent of their cell collections where data values associated with the cells in those cell collections match with the attribute values 104 of the query. This is referred to as distributed spatial analysis through DGGS cell refinement and can be implemented, for example, by process 500 which is explained in more detail with respect to FIG. 5.

According to at least one embodiment described herein, the controller 204 can be organized into Relational, NoSQL, or Object databases using known techniques to normalize, denormalize, relate, aggregate, duplicate, and join data entries. As the properties of the DGGS 101 can be used to represent and index the physical location of cells and cell attributes as discrete indexable data objects as described herein, queries and searches across very large data stores can scale and be distributed through horizontal partitioning (e.g. sharding) and by deploying geohashing techniques. As such, the catalog of the controller 204 can be spatially distributed and operations performed on the catalog can be parallelized 609 as shown in FIG. 6.

Connectivity of Components

As shown in FIG. 2, the system 200 containing the DGGS decoder 203, the controller 204, the client terminal 205, and the DGGS encoder 202 may be networked via data communication links 206. The data communications links 206 may be implemented using one or more computer networking technologies, such as the Internet, a wide-area network and/or a local-area network, configured as a client-server network and/or a peer-to-peer network, using local and/or cloud-based computer resources.

Figure 7:
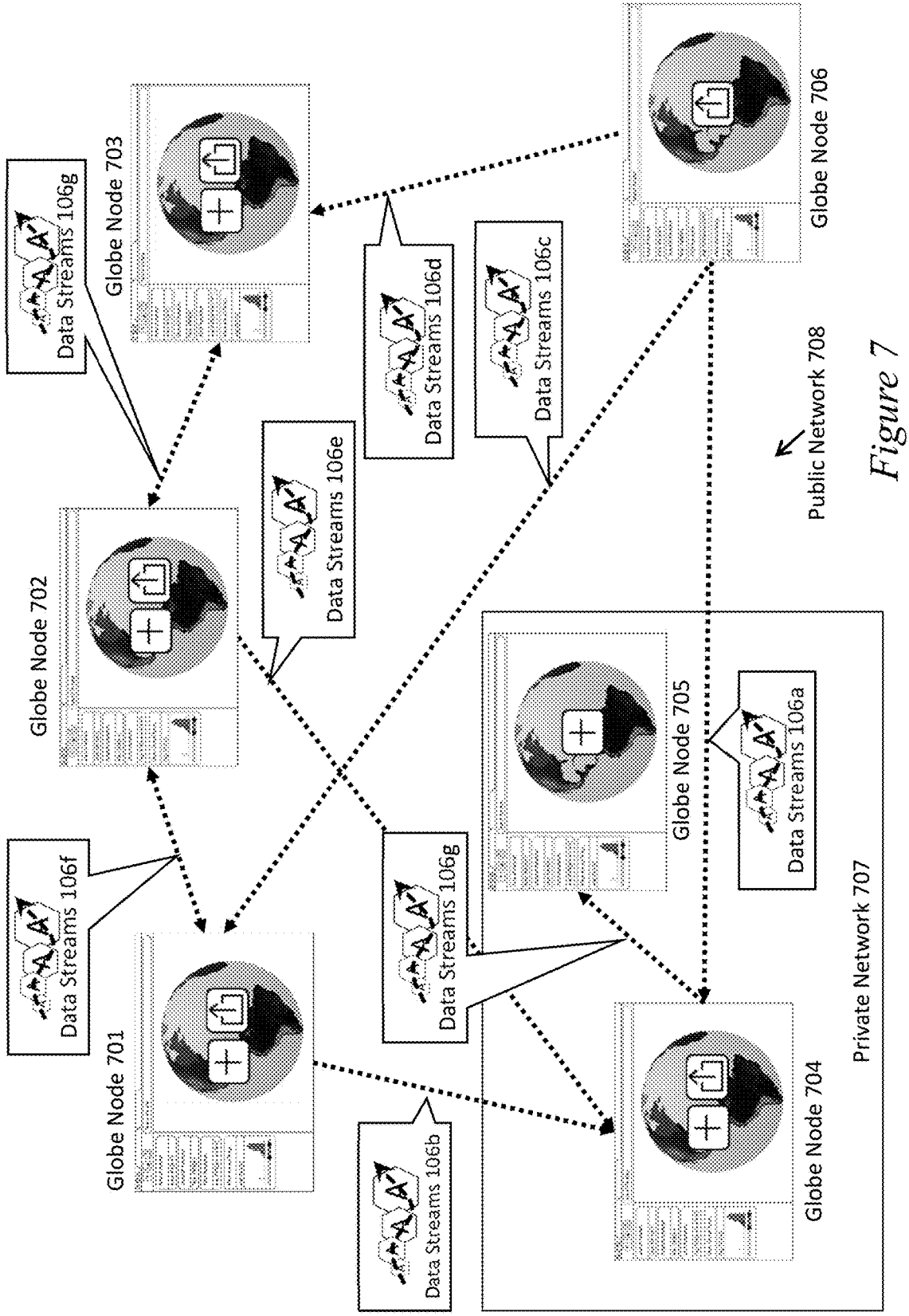
FIG. 7 shows an example embodiment of client terminals and distributed geospatial data sources acting as nodes in a Digital Earth network in accordance with the teachings herein.

The client terminal 205 is shown as being distinct from the DGGS encoder 202 for the purposes of discussion and explanation. However, in some cases, the client terminal 205 can be configured to act as an encoder 202 so that the client terminal 205 can act on a geospatial data source, e.g. import and encode data sources 201, or generate new source data by processing data values 104 and provide access to (i.e. share) its geospatial data with another computing device that is acting as a client terminal. Therefore, according to some embodiments, a client terminal 205 can be used to create and/or manage its own geospatial data, and make this geospatial data available to other computers on the network of system 200 thereby acting as a geospatial data source as shown in FIG. 7 for an example embodiment. Accordingly, in some cases, the client terminal 205 and any of the geospatial data sources that are available from the DGGS encoder 202 may act as equivalent nodes on the network shown in FIG. 7.

While the example in FIG. 2 depicts a network topology for the system 200, the system 200 does not depend on a particular network topology. For example, in at least one embodiment, a single stand-alone computer may be configured to provide any or all of the features and functions described for the DGGS decoder 203, the catalog of the controller 204, the client terminal 205, and the DGGS encoder 202. Alternatively, in at least one embodiment, the functions and features provided by any or all of the DGGS decoder server 203, the catalog of the controller 204, the client terminal 205, and the DGGS encoder 202 may be distributed over any number of discrete computing devices that engage in networked communication with each other such as in a peer-to-peer network or cloud-based network, for example.

While the data communications links 206 are shown as an example in FIG. 2, and some data communications links are not shown, multiple network topologies can be used, and it is not necessary that the network comprises a central node, or a particular node corresponding to the DGGS decoder 203. Other examples of network topologies are shown in FIG. 4 as system configurations 400*a*, 400*b* and 400*c*.

As indicated previously, the stippled lines from DGGS 101 in FIG. 2 indicate functions that can be performed by the encoder 202, the decoder 203 and the controller 204 based on basic DGGS operations (discussed previously), and further sequencing these basic operations to perform more complex operations, through computer code or instructions.

Furthermore, any or all of the features and functions of the DGGS decoder 203, the controller 204, the client terminal 205, and the data encoder 202 may be performed using a variety of known computing devices, including mobile devices. For example, as in FIG. 2, the client 205 may be a mobile phone or tablet device. As such, as used here, terms such as "click" and "mouse" are merely representative of typical input devices and input techniques, and it should be understood that other input devices and input techniques may also be used in other embodiments. For example, a touch screen may be used along with touch-screen input techniques such as tapping, pinching, and gesture-based input.

Spatial Analysis Process 500

Figure 6:
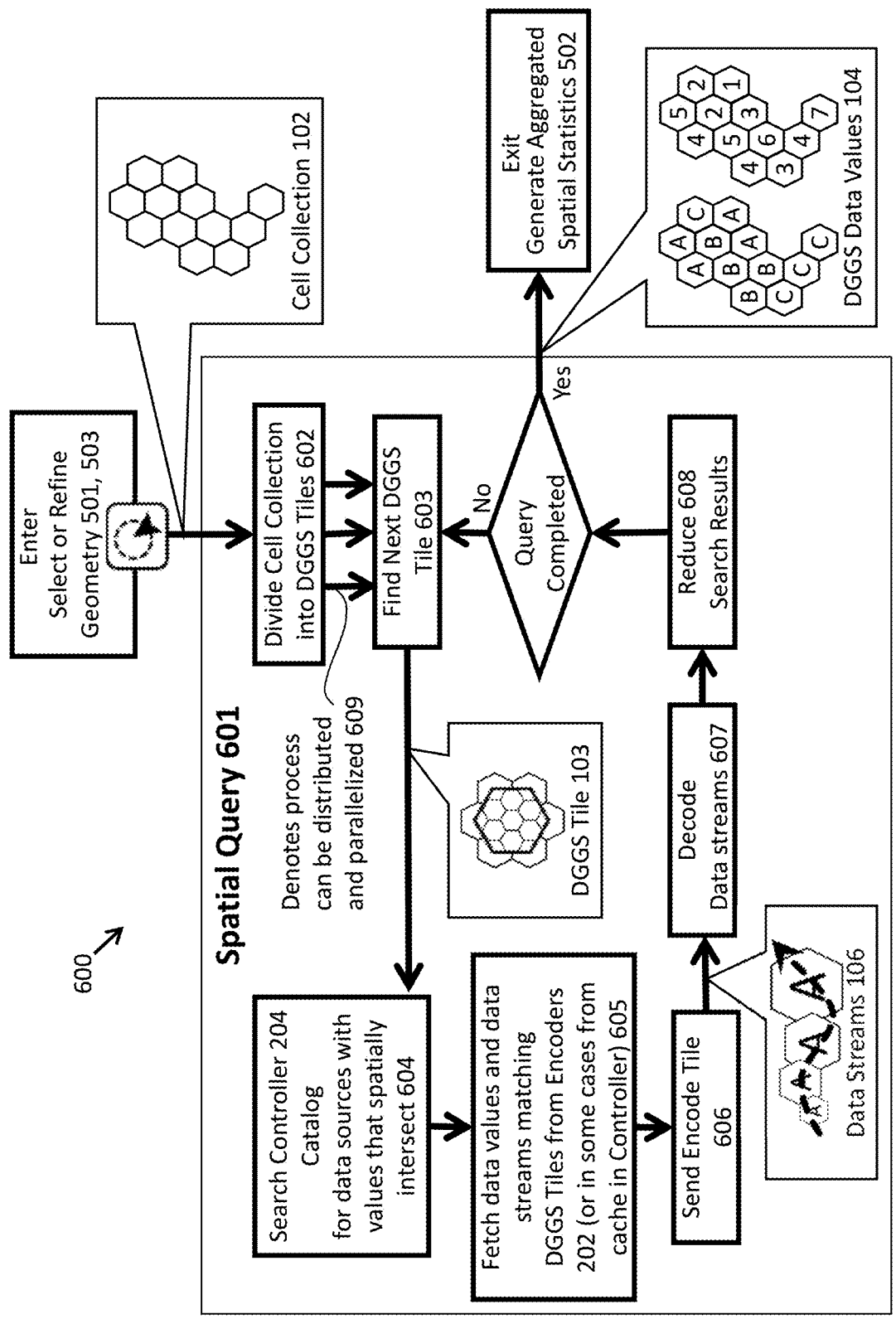
FIG. 6 shows a flowchart and diagrams representing results from certain actions in the flowchart for an example embodiment of a method for performing a spatial query of FIG. 5 in accordance with the teachings herein.

As indicated and illustrated in FIGS. 5 and 6, the system 200 allows data values 104 from multiple distributed data sources 201 to be acquired and integrated through an initial spatial query 601 that includes a geometry, which is selected at the client 205 and defined by cell collection 102. Accordingly at act 501, a first geometry is selected. Indexes for the cell collection 102 associated with the first geometry are then transmitted in a first data stream to the controller 204 in spatial query 601 to find one or more data sources 201 with data values 104 and data streams 106 associated with cells that intersect with the cell collection 102 and in some cases the metadata, time period, and/or attributes of interest. Accordingly, the first spatial query 601 includes obtaining first data values and data streams from encoders 202 that the controller 204 locates. In some cases, limited data is cached in the controller 203 catalog for fast preview. An example of the first geometry of the spatial query 601 may be the Canadian Province of Alberta 102 and an example of the data values 104 may be elevations and population density for the Canadian Province of Alberta. The matching data values 104 are passed through DGGS 101 operations to generate spatial statistics at act 502 resulting in first aggregated statistical summaries 105. The first aggregated statistical summaries 105 (and possibly the associated data values 104) are sent to the client 205.

Certain attributes of the data values 104 and the summaries 105 that are sent to the client terminal 205 can then be used to sub-select cells having specific attributes. This may be done using the graphical user interface 300 to obtain a refined geometry at act 503 of the method 500. For example, a refinement of all the elevations (e.g. data values 104) contained within Alberta (e.g. the cell collection 102) to only those elevations between 500 m and 1000 m. The refined geometry that results from act 503 can be represented by a second cell collection 102'.

Indexes for the cell collection 102' associated with the refined geometry are then transmitted in a data stream to the controller 204 in spatial query 601' to determine one or more data sources 201 with data values 104' associated with cells that intersect with the cell collection 102' and in some cases the metadata, time period, and/or attributes of interest. Accordingly, the second spatial query 601' may include using the data sources and data values 104 from the first query 601 and new data values from one or more additional data sources. For example, the new attribute may be mean annual temperature. This new collection of matching data values 104' are passed through DGGS 101 operations to generate spatial statistics 502' resulting in aggregated statistical summaries 105'. The aggregated statistical summaries 105' (and possibly the associated data values 104') are sent back to the client terminal 205.

At this point, the user at the client terminal 205 may further refine the cell geometry 503' using the updated statistics 105' and/or data values 104' to obtain a third cell collection 102". For example, at the client terminal 205 the updated statistics 502' and data values 104' can be used to find an area having a higher than average temperature. The result of this second refinement is the cell collection 102". At this point, a further spatial query 601" may be made by the client terminal 205 and the process of obtaining data values 104" and updated summary statistics is performed again and passed to the client terminal 205 for display and use. Accordingly, method 500 can include several iterations of refining cell collections and associated aggregated statistics.

In other words, the spatial analysis query "What is here?" is activated by passing the indices for a collection of cells 102 to the catalog of the controller 204 and in return extracting and receiving the data values 104 through encoder 202 where data values 104 match or are contained within the collection of cells 102. The data values 104 may be further integrated, aggregated, transformed and/or processed using DGGS 101 operations that generate aggregated spatial statistics 502. The resulting values and statistics 105 are transmitted in a data stream to the client terminal 205 to display these data values and statistics as representations of the character of the location of interest. As an example this method may be used to answer the question, "What is the mean temperature and average population density for areas with an elevation above 500 m and below 1000 m in the province of Alberta?" by accessing multiple distributed data sources 201 through the spatial analysis process 500.

The spatial query "Where is it?" is activated at the client terminal based on an initial spatial query to identify one or more cell collections that have associated data values with certain characteristics or attributes in an initial spatial extent, such as the entire globe or a certain collection of cells. The indices for the resulting one or more cell collections, the aggregated statistics and optionally the associated data values that satisfy the initial spatial query are then sent in a data stream to the client terminal 205. At this point the spatial analysis may involve further iterations by allowing the user to select and refine the returned cell collection(s) by operating on the data values referenced to (i.e. associated with) these cells and the spatial statistics 105 that are returned to the client terminal 205 according to the spatial query act 601 and the generate spatial statistics 502. As an example this method may answer the question, "Where in Alberta is the annual temperature above average and the population density below the average?" by accessing multiple distributed data sources 201 through the spatial analysis process 500.

A spatial extent is a bounding box that encompasses the entire schema for a given spatial area and contains all of the geometries for that spatial area. In DGGS one or more bounding tiles are used in the spatial query process to determine quickly if a specific data source might be of interest. For example, if someone is analyzing region A and wants to check on certain objects in region A then data for region B does not intersect with the bounding tiles for region A and region B is ignored.

The select geometry action 501 and the refine geometry action 503 can occur by many methods such as, but not limited to, user input, a graphical method, an algorithm, a search criteria, a filter using data values or a query string, or by processing natural language. A selection of a collection of cells 102 may be refined or changed by applying modifiers to the data values 104, statistics 502, and by additional geometry 501. For example two of more different cell collections 102 might be connected in a Boolean operation to result in a new cell collection. Another example may be the use of the data values 104 as one or more variables in terms of an algebraic expression that result in a set of data values that may then be used to refine the original cell collection. Another example is the expansion or contraction of a selected geometry by the application of a buffer of specified distance around the selected geometry, such as adding 400 m around the current area of selection, for example.

FIG. 6 illustrates the detail of an example embodiment of a spatial query process 600 used with the DGGS 101 and system 200 for implementing a spatial query 601. At act 602, the cell collection that is passed to the controller 204 is parsed into DGGS tiles 603 that are indexed for fast look up and distributed for parallel processing 609. The process 601 can be distributed for each data tile extracted from the cell collection. At act 604, the catalog entries are searched for matching cell indexing (i.e. cell collections that intersect (i.e. overlap) with the cell collection of the spatial query 601) to identify spatial data sources that contain data of interest. At act 605, the encoders 202 that are associated with the data sources that were identified as a positive match at act 604 are queried for their data values 104. At act 606, the data values 104 that were obtained are then encoded to a DGGS tile that is then streamed in a data stream 106 at act 607 to the decoder 203 and then reduced (e.g. combined) at act 608 with other data streams that have been received. This process repeats until all of the data tiles for a given collection of cells at a specified resolution have been received at the controller encoder 202. The resulting collection of data values can then be processed via DGGS operations to generate the aggregated spatial statistics 502 for the cell collection 102.

User Interface 300

The client terminal 205 is able to display a graphical user interface 300 with which a user can interact to run the spatial analysis process 500 and display the spatial analysis results. The main operations that can be accessed or performed by a user who uses the client terminal 205 not only includes interacting with the interface 300, which is provided as an example, but also includes in summary one or more of the following:

1) The ability to search, select, and add data sources (that are shown at display region 305) and data values 104 of interest. For example, in at least one embodiment the user can manually browse a collection of data sources that meet a specified condition and/or meet spatial constraints. As another example, in at least one embodiment, collection of cells 102 can be auto-generated based on the user's navigation position on the globe 301 and/or search terms based on user actions and preference.

2) The ability to use selection tools 306 and/or refinement tools 309 to define a selection of one or more cell collections 302. For example, in at least one embodiment, the user can perform selection and/or refinement by entering or picking geographic coordinates (points) that define an area, e.g. a bounding box, circle, polygon, etc., to select cells contained by the resulting geometry. In another example, in at least one embodiment, the user can enter query parameters (e.g. a search term or search strings) to "select where" one or more of metadata, time period, geometry, attributes and spatial extents from original data sources 201 or to "select where" cells defined implicitly by indexing (i.e. tiles 103) match filtered data values or ranges of data values and/or attributes associated with cells, thereby resulting in a selection of cells 302. Another example, in at least one embodiment, the user can apply an algorithm as a search parameter that uses data values and/or cell indexing as an input, such as, but not limited to, an algorithm that calculated a drainage area or watershed from the input of elevation data values and an outlet cell resulting in a selection of cells 302 encompassing the watershed.

3) The ability to display and transform at least one of data values 104, selection of cell collections 302, and their resulting aggregated spatial summaries (via refinement tool 309). For example, one or more of the following can be performed: data values can be rendered as graphics elements on the DGGS globe 301, colour coded attributes or ranges of values can be listed in the DGGS legend 303, a spatial summary can be displayed in the widget 309. In any case, the data values are available as inputs into any DGGS 101 operations and, by way of the interface 300, data values from cells can be assigned to an algebraic expression to derive new data values or through parametrization to create predictive models of behavior.

4) The ability to share or publish data and the results of data analysis to the catalog via a publish or share results input 307 such that the spatial results can be used, modified, or copied, as a data source by at least one other client terminal 205. For example, a user can perform at least one of saving a locally derived data source 201, a given spatial analysis for later queries, sharing spatial analysis results with other users in such a way that with permission they might collaborate together to show certain spatial data and/or phenomena on a DGGS globe, generating new instances or separate branches of a DGGS globe based on the original DGGS globe, embedding a DGGS globe as interactive node on a website or a mobile application, or sharing a globe as an embedded object to a social media application similar to an embedded video.

In particular, the interface 300 provides a user with a method of searching spatial data sources 201 that are registered in catalogs of the system 200 and selecting which spatial data sources 201 to use or searching for additional data sources that are not registered in the catalogs of the system 200 and selecting which of those additional data sources to use and then graphically display values obtained from the selected spatial data sources 201 or values determined from operations on values obtained from the selected spatial data sources in the DGGS legend 303. Spatial data values 104 from one or more spatial queries made by the user can be received via data streams 106 as needed, for example based on how the user navigates and interacts with the DGGS globe 301 or utilizes the search tools, and then rendered by displaying at least one of meshes, textures, texts, icons and other graphics on the DGGS globe 301 and associated values in the DGGS legend 303.

The interface 300 includes a set of DGGS cell selection tools 306 that allow a user to select an area of cells 302 on the globe 301 or activate an algorithm that selects an area that results in a collection of cells in accordance with the teachings herein. The DGGS cell selection tools 306 include, but are not limited to, a pointing tool, a freehand tool, and borders.

For example, one of the cell selection tools 306 can include a pointing tool for receiving input from a user to allow the user to point to and select a collection of cells using an appropriate input device and a pointer, such as a mouse pointer. For example, a user can select one cell collection with one click of a mouse or by selecting several points to define more complex selection of cell collections by directly clicking on the desired cells and/or cell collections on the DGGS globe 301.

Alternatively, or in addition thereto, in at least one embodiment, one of the cell selection tools 306 can include a freehand tool for receiving input from a user to allow the user to make a freehand selection of a collection of cells using an input device like a mouse pointer, for example. For example, a user may select one or more collection of cells based on using the freehand tool to draw a boundary around one or more cell collections.

As another example, a data feature may be a political border, and the corresponding visual representation may be a corresponding border drawn around a collection of cells on the DGGS globe 301. In this case, a user may click on the political border (visual feature), or on visual cells within an area defined by the political border, and thereby select all of the visual cells within the political border.

Alternatively, or in addition thereto, in at least one embodiment, the DGGS legend 303 or at least a portion thereof may be overlaid on the DGGS globe 301 in close proximity to a cell collection that has been selected by the user and for which the data in the DGGS legend 303 corresponds to.

The DGGS legend 303 is able to graphically display a description of the data sources that are active in the interface 300 and on the DGGS globe 301 and, when a selection of a data source and a collection of cells is made, display in the fields indicated by reference 304 the aggregated summaries 105 of the data values 104 returned from the spatial analysis process 500 of the selected data sources and selected one or more cell collections 302, in accordance with the teachings herein. The interface 300 also allows the user to interact with the spatial statistics and/or aggregated summaries 304 to refine the selection of geometry in accordance with the teachings herein by allowing the user to provide refinement input through spatial summary and refinement input widget 309.

Aggregated summaries 105 can include raw data values, histograms showing the distribution of the data values as well as frequency, wavelet transforms of the data values, the result of mathematical operations between various data values, statistics on the aggregation of data values of the selected cell collections (examples of these statistics include but are not limited to sum, mean, average, count, max, and min), or the result from using the data values along with algorithms to compute or model a secondary phenomenon where the user might be prompted for more information. One intention of the spatial analysis is to characterize the phenomenon, object, or location being studied.

The statistics for the aggregated summaries 304 displayed for a given selection or refinement of collection of cells can be displayed using any known data visualization tools: such as graphs, pies, tables, lists, symbols or annotations, a 3D Model, word-clouds and other systems known as widgets or as an animated sequence of graphs or symbols, that can be shown on a report, a legend, or annotated on the DGGS globe 301. The interface 300 can show a single widget or many widgets associated with any given data source. The DGGS legend 303 of the interface 300 may use various symbols, colors, patterns, and other graphical effects to indicate a relationship between the statistics shown in the DGGS legend 303 and the corresponding data shown visually on the DGGS globe 301. For example, the aggregated summaries 304 can include the area of one or more collection of cells that are initially selected or refined.

Figure 3:
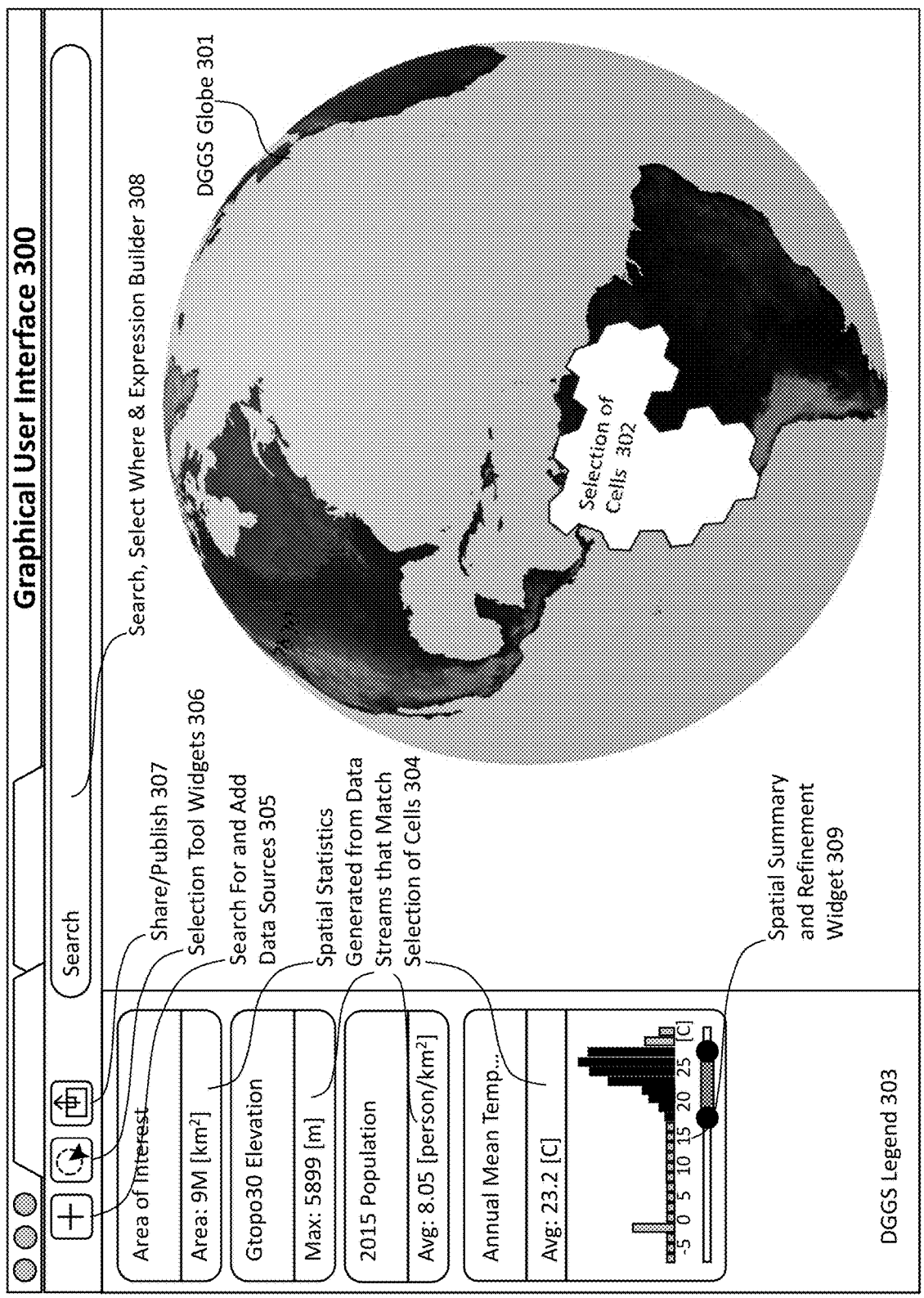
FIG. 3 shows an example embodiment of a graphic user interface that allows a user to make spatial queries and visualize the resulting spatial data including resulting cell collections, data values and data summaries in accordance with the teachings herein.

Moreover, if a widget allows the user to select a range, then this can be used as trigger for refining the geometry of one or more selected cell collections based on the user selections made on the statistics, an example of which is shown as 309 in FIG. 3. Alternatively, or in addition thereto, in at least one embodiment refinement of the collection of cells 302 can be performed by the user by using a graphical method, an algorithm, search criteria, a filter using a query string, or by processing natural language. When a current selected cell collection 302 is refined and updated so that the geometry is updated to cover a subset of cells within the cell collection 302, the statistics and data shown in the DGGS legend 303 can be updated based on the data values 104 associated with the refined subset of cells. At this point there can be further iterations as the user can make further queries for cells within the cell collection having data values satisfying certain criteria which results in a refined cell collection and updated aggregated statistics.

In this particular example, the aggregated summaries 304 correspond to maximum elevation, annual population and average temperature for the selected cell collection 302. Furthermore, the widget showing the summary statistics for temperature of the selected cell collection 302 provides a range of temperatures that the user can interact with to further refine the cell collection 302 by picking a temperature range which then updates the DGGS globe 301 to show a revised subset of cells within the current cell collection 302 that have associated temperature values that correspond with the selected temperature range.

Although the example in FIG. 3 shows a use case where there is only a single collection of cells 302 that is selected and which is reported as an area of interest in the DGGS legend 303, in at least one embodiment, the interface 300 is configured to allow the user to select several cell collections to either obtain statistics for each selection, compare statistics between two or more of the selected cell collections or add the statistics for all of the selected cell collections together. This may be done by holding down the "CTL" key while picking multiple cell collections 302 that are displayed on the DGGS globe 301 which results in the automatic generation of multiple statistics in the DGGS legend 303 that match each selection of cell collections—so the areas can be compared—or, holding down the "SHIFT" key while picking multiple cell collections 302 that are displayed on the DGGS globe 301 which result in the automatic generation of a single statistics in the legend 303 calculated by adding all the selected cell collections—so these areas can be combined.

In at least one embodiment, the interface 300 includes an input means for allowing the user to add a new geospatial data source to search for data values 104. For example, a user can click on an "add" button 305 to search for and add one or more geospatial data sources which the controller 204 can interact with to obtain data values 104 of interest (e.g. see system configuration 400*b* or 400*c* in FIG. 4) or to which the client terminal 205 can directly interact with via an encoder 202 and a decoder 203 (e.g. see system configuration 400*a* in FIG. 4). For example, the user via client terminal 205 may choose to add one or more of a geospatial data source pertaining to elevation in Ireland, a geospatial data source pertaining to elevation in Alaska, a geospatial data source pertaining to ocean elevations and shark attacks, and so on.

In at least one embodiment, the interface 300 is configured to allow the user to save and register a selection of cells 302 along with any data values 104 associated with the selection of cells 302 and send this new information back to the catalog of the controller 204 where it can be shared as a new data stream 106 for other users that can use this new information. This is represented by the Publish operation shown in FIG. 2.

The interface 300 includes a search bar 308 that allows the user to search for data, enter and execute "Search Where" queries, and build algebraic expressions using the data values in the cells. The search input by the user may include entering a simple search query such as "Where is Calgary?" or entering a more complex search query such as "where are locations with elevations between 500 m and 1000 m, temperatures in July that are above the Alberta average, streams stocked with trout and population density less than 0.1 persons per square kilometer". As another example, the expression builder may be used by the user to subtract the present day "Mean Average Temperature" from a model of future "Mean Average Temperature 2050" to show the range of climate change expected over all or a certain portion of the globe.

Although the term client terminal 205 is used here as a graphics user interface 300, it can also be an Application program interface (API) terminal that can allow others systems and network entities to communicate with it. The API may encompass the routines, protocols, and tools to provide these entities with the same functionality as the terminal client 205.

Network Effect

The interface 300 includes a method to publish, save, and/or share data values 104 as described herein in such a way that the client terminal 205 can act as a data encoder 202 and as a data source node in the network of system 200. Once the analysis has been completed by the user, the resulting spatial analysis can be shared back to the network as a collection of cells or geometry and related cell values, where it can be discovered and used again by other users.

Referring to FIG. 7, there is shown a Digital Earth network 700 with different DGGS globes that act as network nodes 701 . . . 706. Each DGGS globe node 701 . . . 706 can act as an independent system 200 with various system configurations (examples of which were given as system configurations 400a, 400b and 400c), which includes in at least one embodiment a client terminal 205 that acts as a geospatial data source and is connected to one of the encoders 202 at any particular time (based on the operations being performed at the client terminal, i.e. requesting and obtaining data values and/or generating new data values based on queries). In this way, each client terminal 205 that generates and/or receives DGGS values 104 is also able to act as a geospatial data source by making data streams 106 available to other client terminals. The network can be further divided in private networks that might be able to read data from public networks but whose setting prohibit nodes in the public network from access to its resources.

In the case of a geographically distributed system where nodes can be physically located far from one another, node 701 for example can be used to perform federated search requests to the controller 204 and catalog set up by nodes 702, 703, and 706 as the catalogs and the controllers can be distributed (as described previously) and communicate updates between them as disclosed herein.

The Digital Earth network 700 can also include some network nodes referred to as geospatial content nodes that include geospatial data provided by different organizations. For example, the network 700 can include a NASA content node, an Environment Canada content node, a Costar content node 314, and a City of Calgary content node 316. Accordingly, these content nodes can behave as geospatial data sources. However, in some embodiments, these content nodes can behave as a client terminal at any particular time.

While the applicant's teachings described herein are in conjunction with various embodiments for illustrative purposes, it is not intended that the applicant's teachings be limited to such embodiments as the embodiments described herein are intended to be examples. On the contrary, the applicant's teachings described and illustrated herein encompass various alternatives, modifications, and equivalents, without departing from the embodiments described herein, the general scope of which is defined in the appended claims.

The invention claimed is:

1. A computer-implemented method for performing spatial analysis on a Discrete Global Grid System (DGGS) globe of a graphical user interface on a client terminal, the DGGS globe comprising a hierarchical tessellation of cells, wherein the method comprises:
    sending a spatial query from the client terminal to at least one controller with at least one encoder, the spatial query comprising an initial cell collection and at least one search constraint based on one or more of at least one value, at least one metadata, at least one attribute name and at least one time value;
    identifying at least one encoder data stream having DGGS values for geospatial data that was obtained from two or more distributed geospatial data sources, where the at least one encoder data stream corresponds with the initial cell collection and the at least one search constraint;
    fetching the DGGS values in the identified at least one encoder data stream;
    performing DGGS operations on the DGGS values to generate aggregated spatial statistics; and
    displaying, at the client terminal, the initial cell collection, the DGGS values and the aggregated spatial statistics using a visualization tool.

2. The method of claim 1, wherein the method comprises:
    generating a refined cell collection by sub-selecting cells using DGGS operations on data values associated with at least one of the initial cell collection and the aggregated spatial statistics;
    sending an updated spatial query including the refined cell collection and at least one updated search constraint from the client terminal to the at least one controller and the at least one encoder;
    identifying at least one second encoder data stream having second DGGS values for geospatial data that was obtained from two or more distributed geospatial data sources, where the at least one second encoder data stream corresponds with the refined cell collection and the at least one updated search constraint;
    fetching the second DGGS values of the identified at least one second encoder data stream;
    performing DGGS operations on the second DGGS values to generate refined aggregated spatial statistics; and
    displaying, at the client terminal, the refined cell collection, the second DGGS values and the refined aggregated spatial statistics in at least one of the DGGS legend and at least a portion of the DGGS globe.

3. The method of claim 2, wherein the method comprises providing the spatial query with multiple time values that are to be used for temporal filtering.

4. The method of claim 2, wherein the at least one updated search constraint comprises at least one of the refined cell collection, at least one updated value, at least one updated metadata, at least one updated attribute name and at least one updated time value.

5. The method of claim 4, wherein the at least one updated search constraint further comprises specifying at least one additional distributed geospatial data source.

6. The method of claim 1, wherein the method comprises:
generating a refined cell collection by sub-selecting cells using DGGS operations on second DGGS values associated with at least one of the initial cell collection and the aggregated spatial statistics;
performing DGGS operations on the DGGS values to generate refined aggregated spatial statistics; and
displaying, at the client terminal, the refined cell collection, the second DGGS values and the refined aggregated spatial statistics in at least one of the DGGS legend and at least a portion of the DGGS globe.

7. The method of claim 1, wherein the method further comprises applying a data stream decoder to transform data streams to formats that can be read and displayed at the client terminal.

8. The method of claim 1, wherein the acts of identifying the at least one encoder data stream, fetching the DGGS values in the identified at least one encoder data stream; and performing the DGGS operations to generate the aggregated spatial statistics occur at the at least one controller and the method further comprises, at the at least one controller:
sending a data stream comprising indices of the initial cell collection and the aggregated spatial statistics to the client terminal.

9. The method of claim 1, wherein the method further comprises:
sending cell indices for the initial cell collection to an encoder associated with the identified at least one encoder data stream;
fetching the DGGS values in the identified at least one encoder data stream;
calculating, at the encoder, the aggregated spatial statistics on the DGGS values in the identified at least one encoder data stream; and
sending a data stream comprising indices for the initial cell collection and the aggregated spatial statistics from the encoder to the client terminal.

10. The method of claim 1, wherein the method further comprises:
sending cell indices for the initial cell collection to an encoder associated with the identified at least one encoder data stream;
fetching the DGGS values in the identified at least one encoder data stream;
sending a data stream comprising indices for the initial cell collection and the DGGS values from the encoder to the client terminal; and
calculating, at the client terminal, the aggregated spatial statistics on the DGGS values in the identified at least one encoder data stream and displaying the initial cell collection, the DGGS values and the aggregated spatial statistics in at least one of a DGGS legend and at least a portion of the DGGS globe.

11. The method of claim 1, wherein the method further comprises:
locating an additional geospatial data source;
extracting, recording, and encoding geospatial data from the additional geospatial data source; and
registering the encoded geospatial data at the at least one controller.

12. The method of claim 11, wherein the acts of locating and extracting, recording and encoding occur at the client terminal, at the at least one controller or at an encoder associated with the additional geospatial data source.

13. The method of claim 1, wherein the method further comprises registering the initial cell collection and the aggregated spatial statistics with the at least one controller.

14. The method of claim 1, wherein the visualization tool comprises at least one of graphs, pies, tables, lists, symbols or annotations, a 3D Model, word-clouds, widgets, an animated sequence of graphs or symbols, a report, a DGGS legend and at least a portion of the DGGS globe.

15. A system for performing spatial analysis on a Discrete Global Grid System (DGGS) globe comprising a hierarchical tessellation of cells wherein the system comprises:
at least one controller with at least one encoder for controlling the operation of the system; and
a client terminal, operatively coupled to the controller, the client terminal comprising a graphical user interface for displaying the DGGS globe, the client terminal being configured to send a spatial query to the at least one controller, the spatial query comprising an initial cell collection and the at least one search constraint based on one or more of at least one value, at least one metadata, at least one attribute name and at least one time value;
wherein, at least one encoder data stream having DGGS values is identified for geospatial data that was obtained from two or more distributed geospatial data sources, where the at least one encoder data stream corresponds with the initial cell collection and the at least one search constraint; the DGGS values in the identified at least one encoder data stream are fetched; DGGS operations are performed on the DGGS values to generate aggregated spatial statistics; and the client terminal is configured to display the initial cell collection, the DGGS values and aggregated spatial statistics using a visualization tool.

16. The system of claim 15, wherein the client terminal is configured to generate a refined cell collection by sub-selecting cells using DGGS operations on data values associated with at least one of the initial cell collection and the aggregated spatial statistics; send an updated spatial query including the refined cell collection and at least one updated search constraint from the client terminal to the at least one controller and the at least one encoder; identify at least one encoder data stream having the DGGS values for geospatial data that was obtained from two or more distributed geospatial data sources, where the at least one encoder data stream corresponds with the refined cell collection and the at least one updated search constraint; fetch the DGGS values in the at least one encoder data stream; perform DGGS operations on the DGGS values to generate refined aggregated spatial statistics; and display the refined cell collection, the DGGS values and the aggregated spatial statistics in at least one of the DGGS legend and at least a portion of the DGGS globe.

17. The system of claim 16, wherein the at least one updated search constraint comprises at least one of the refined cell collection, at least one updated value, at least one updated metadata, at least one updated attribute name and at least one updated time value.

18. The system of claim 17, wherein the at least one updated search constraint further comprises specifying at least one additional distributed geospatial data source.

19. The system of claim 16, wherein the spatial query comprises multiple time values that are to be used for providing temporal filtering.

20. The system of claim 15, wherein the client terminal is configured to generate a refined cell collection by sub-selecting cells using DGGS operations on data values associated with at least one of the initial cell collection and the aggregated spatial statistics; perform DGGS operations on the DGGS values to generate refined aggregated spatial statistics; and display the initial cell collection, the DGGS values and the aggregated spatial statistics in at least one of the DGGS legend and at least a portion of the DGGS globe.

21. The system of claim 15, wherein the system comprises a data stream decoder for transforming data streams to formats that can be read and displayed at the client terminal.

22. The system of claim 15, wherein the at least one controller is configured to:
identify the at least one encoder data stream, fetch the DGGS values in the identified at least one encoder data stream and perform the DGGS operations one the DGGS values to generate the aggregated spatial statistics; and
send a data stream comprising indices of the initial cell collection and the aggregated spatial statistics to the client terminal.

23. The system of claim 15, wherein the system further comprises an encoder that is associated with the identified at least one encoder data stream and the encoder is configured to:
receive cell indices for the initial cell collection;
fetch the DGGS values in the identified at least one encoder data stream;
calculate the aggregated spatial statistics on the DGGS values in the identified at least one encoder data stream; and
send a data stream comprising indices for the initial cell collection and the aggregated spatial statistics to the client terminal.

24. The system of claim 15, wherein the system further comprises an encoder that is associated with the identified at least one encoder data stream and the encoder is configured to:
receive cell indices for the initial cell collection;
fetch the DGGS values in the identified at least encoder data stream;
send a data stream comprising indices for the initial cell collection and the DGGS values in the identified at least one encoder data stream to the client terminal; and
the client terminal is configured to calculate the aggregated spatial statistics on the DGGS values in the identified at least one encoder data stream and display the initial cell collection, the DGGS values and the aggregated spatial statistics in at least one of a DGGS legend and at least a portion of the DGGS globe.

25. The system of claim 15, wherein for adding an additional geospatial data source, at least one of the at least one controller, the client terminal or an encoder associated with the additional geospatial data source is configured to:
locate the additional geospatial data source; and
extract, record, and encode geospatial data from the additional geospatial data source, and
wherein, the encoded geospatial data is registered at the controller.

26. The system of claim 15, wherein the initial cell collection and the aggregated spatial statistics are registered with the at least one controller and shared for use by other client terminals.

27. The system of claim 15, wherein the system comprises a network of DGGS globe nodes wherein a first node comprises a client terminal and an encoder so that the first node acts as a geospatial data source and another client terminal can discover the geospatial data of the first node.

28. The system of claim 15, wherein the visualization tool comprises at least one of graphs, pies, tables, lists, symbols or annotations, a 3D Model, word-clouds, widgets, an animated sequence of graphs or symbols, a report, a DGGS legend and at least a portion of the DGGS globe.

* * * * *